(12) United States Patent
Futaki et al.

(10) Patent No.: US 12,193,091 B2
(45) Date of Patent: Jan. 7, 2025

(54) RADIO ACCESS NETWORK NODE, USER EQUIPMENT, AND METHODS THEREOF

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 361 days.

(21) Appl. No.: 17/629,845

(22) PCT Filed: May 24, 2021

(86) PCT No.: PCT/JP2021/019544
§ 371 (c)(1),
(2) Date: Jan. 25, 2022

(87) PCT Pub. No.: WO2022/030073
PCT Pub. Date: Feb. 10, 2022

(65) Prior Publication Data
US 2023/0363026 A1  Nov. 9, 2023

(30) Foreign Application Priority Data
Aug. 5, 2020 (JP) .................................. 2020-133305

(51) Int. Cl.
*H04W 76/15* (2018.01)
*H04W 72/27* (2023.01)
*H04W 76/34* (2018.01)
*H04W 88/08* (2009.01)

(52) U.S. Cl.
CPC ........... *H04W 76/15* (2018.02); *H04W 72/27* (2023.01); *H04W 76/34* (2018.02); *H04W 88/085* (2013.01)

(58) Field of Classification Search
CPC .... H04W 36/362; H04W 92/20; H04W 72/27
See application file for complete search history.

(56) References Cited

U.S. PATENT DOCUMENTS

| | | | |
|---|---|---|---|
| 2019/0166646 A1* | 5/2019 | Shih | H04W 72/04 |
| 2020/0053815 A1* | 2/2020 | Teyeb | H04W 76/11 |
| 2020/0169906 A1 | 5/2020 | Tsuboi et al. | |
| 2020/0260325 A1 | 8/2020 | Futaki et al. | |
| 2020/0336364 A1 | 10/2020 | Takahashi et al. | |

(Continued)

FOREIGN PATENT DOCUMENTS

| | | |
|---|---|---|
| WO | 2019/030981 A1 | 2/2019 |
| WO | 2019/031216 A1 | 2/2019 |
| WO | 2019/097610 A | 5/2019 |

OTHER PUBLICATIONS

Extended European Search Report for EP Application No. 21844606.0 dated on Oct. 14, 2022.

(Continued)

*Primary Examiner* — Gary Mui
(74) *Attorney, Agent, or Firm* — Sughrue Mion, PLLC

(57) ABSTRACT

A master node (1) requests a conditional PSCell addition (CPA), via an SN ADDITION REQUEST message (301), to a candidate secondary node (2). The master node (1) also requests the candidate secondary node (2) to configure an SN terminated MCG bearer via the SN ADDITION REQUEST message (301). This can, for example, contribute to mitigating a communication continuity problem caused by a Conditional PSCell Addition (CPA) failure.

17 Claims, 28 Drawing Sheets

(56) References Cited

U.S. PATENT DOCUMENTS

| | | | | |
|---|---|---|---|---|
| 2021/0352543 | A1* | 11/2021 | Purkayastha | H04W 76/11 |
| 2022/0295571 | A1* | 9/2022 | Da Silva | H04W 76/16 |
| 2022/0361060 | A1* | 11/2022 | Wallentin | H04W 36/00837 |
| 2022/0386191 | A1* | 12/2022 | Wu | H04W 36/08 |
| 2022/0386195 | A1* | 12/2022 | Ishii | H04W 76/15 |
| 2022/0408325 | A1* | 12/2022 | Da Silva | H04W 36/0069 |
| 2023/0071268 | A1* | 3/2023 | Xu | H04W 36/36 |
| 2023/0097891 | A1* | 3/2023 | Zhang | H04W 36/0069 370/331 |
| 2024/0049071 | A1* | 2/2024 | Hesse | H04W 36/00695 |

OTHER PUBLICATIONS

LG Electronics Inc: "Transaction ID Issue in CPC", 3GPP Draft; R2-2001536, Feb. 14, 2020, pp. 1-3.

International Search Report for PCT Application No. PCT/JP2021/019544, mailed on Jul. 27, 2021.

R2-1915985, CATT, "Draft stage-2 CR for Conditional PSCell Addition/Change", 3GPP TSG-RAN2 Meeting #108, Reno, USA, Nov. 18-22, 2019, pp. 1-30.

R3-196728, CATT, "TP for TS36423 BLCR Conditional SN Addition &Change Procedure",3GPP TSG-RAN WG3 Meeting #106, Reno, USA, Nov. 18-22, 2019, pp. 1-76.

R3-196975, NTT Docomo, Inc., "(TP for NR_Mob_enh-Core BL CR for TS 36.423) Conditional PScell addition", 3GPP TSG-RAN WG3 Meeting #106, Reno, USA, Nov. 18-22, 2019, pp. 1-36.

* cited by examiner

9.1.4.1 SGNB ADDITION REQUEST

| IE/Groupe Name | Presence | Range | IE type and reference | Semantics description |
|---|---|---|---|---|
| ... | | | | |
| E-RABs To Be Added List | | 1 | | |
| >E-RABs To Be Added Item | | 1..<maxnoofBearers> | | |
| >>E-RAB ID | M | | 9.2.23 | |
| >>DRB ID | M | | 9.2.122 | |
| >>EN-DC Resource Configuration | M | | EN-DC Resource Configuration 9.2.108 | *Indicates the PDCP and Lower Layer MCG/SCG configuration.* |
| >>EN-DC Resource Configuration upon Conditional SN Mobility | O | | EN-DC Resource Configuration 9.2.108 | *Indicates the PDCP and Lower Layer MCG/SCG configuration upon CPA* |
| >>CHOICE Resource Configuration | M | | | |
| >>>PDCP present in SN | | | | This choice tag is used if the PDCP at SgNB IE in the EN-DC Resource Configuration IE is set to the value "present". |
| >>>>.... | | | | |

Fig. 10A

| MeNB to SgNB Container | M | OCTET STRING | Includes the CG-ConfigInfo message as defined in TS 38.331 [31]. |
|---|---|---|---|
| ... | | | |
| SGNB Addition Trigger Indication | O | ENUMERATED | This IE indicates the trigger for SGNB Addition procedure. |
| ... | | | |
| *Conditional SN Addition Information* | O | | |
| >*CPA Trigger* | *M* | ENUMERATED (CPA initiation, CPA replace, *CPA initiation with DRB addition*, ...) | |

Fig. 10B

9.1.4.1 SGNB ADDITION REQUEST

| IE/Groupe Name | Presence | Range | IE type and reference | Semantics description |
|---|---|---|---|---|
| ... | | | | |
| E-RABs To Be Added List | | 1 | | |
| >E-RABs To Be Added Item | | 1..\<maxnoofBearers\> | | |
| >>E-RAB ID | M | | 9.2.23 | |
| >>DRB ID | M | | 9.2.122 | |
| >>*EN-DC Resource Configuration* | *M* | | *EN-DC Resource Configuration 9.2.108* | *Indicates the PDCP and Lower Layer MCG/SCG configuration.* |
| >>*EN-DC Resource Configuration upon Conditional SN Mobility* | O | | *EN-DC Resource Configuration 9.2.108* | *Indicates the PDCP and Lower Layer MCG/SCG configuration upon CPA* |
| >>CHOICE Resource Configuration | M | | | |
| >>>PDCP present in SN | | | | This choice tag is used if the PDCP at SgNB IE in the EN-DC Resource Configuration IE is set to the value "present". |
| >>>... | | | | |
| ... | | | | |

Fig. 11A

| | | | |
|---|---|---|---|
| MeNB to SgNB Container | M | OCTET STRING | Includes the CG-ConfigInfo message as defined in TS 38.331 [31]. |
| ... | | | |
| *SGNB Addition Trigger Indication* | O | ENUMERATED (SN change, inter-MN HO, intra-MN HO, *Conditional SN addition, Conditional PSCell addition*, ...) | This IE indicates the trigger for SGNB Addition procedure. |
| ... | | | |
| Conditional SN Addition Information | O | | |
| >CPA Trigger | M | ENUMERATED (CPA initiation, CPA replace, ...) | |

Fig. 11B

9.1.2.1 S-NODE ADDITION REQUEST

| IE/Groupe Name | Presence | Range | IE type and reference | Semantics description |
|---|---|---|---|---|
| ... | | | | |
| PDU Session Resources To Be Added List | | 1 | | |
| >PDU Session Resources To Be Added Item | | 1.. <maxnoofPDUsessions> | | |
| >>PDU Session ID | M | | 9.2.3.18 | |
| >>... | | | | |
| >>*PDU Session Resource Setup Info - SN terminated* | *M* | | *9.2.1.5* | |
| >>... | | | | |

*Non-GBR Resources Offered* — 1220

Fig. 12A

| M-NG-RAN node to S-NG-RAN node Container | M | OCTET STRING | Includes the CG-ConfigInfo message as defined in subclause 11.2.2 of TS 38.331 [10] |
|---|---|---|---|
| ... | | | |
| SN Addition Trigger Indication | O | ENUMERATED | This IE indicates the trigger for S-NG-RAN node Addition procedure. |
| ... | | | |
| *Conditional SN Addition Information* | O | | |
| >*CPA Trigger* | M | ENUMERATED (CPA initiation, CPA replace, *CPA initiation with QoS flow addition*, ...) | |

9.1.2.1 S-NODE ADDITION REQUEST

| IE/Groupe Name | Presence | Range | IE type and reference | Semantics description |
|---|---|---|---|---|
| ... | | | | |
| PDU Session Resources To Be Added List | | 1 | | |
| >PDU Session Resources To Be Added Item | | 1..<maxnoofPDUsessions> | | |
| >>PDU Session ID | M | | 9.2.3.18 | |
| >>... | | | | |
| >>*PDU Session Resource Setup Info - SN terminated* | *M* | | *9.2.1.5* | |
| >>... | | | | |

1320 → *Non-GBR Resources Offered*

| | | |
|---|---|---|
| M-NG-RAN node to S-NG-RAN node Container | M | OCTET STRING | Includes the CG-ConfigInfo message as defined in subclause 11.2.2 of TS 38.331 [10] |
| ... | | | |
| *SN Addition Trigger Indication* | O | ENUMERATED (SN change, inter-MN HO, intra-MN HO, *Conditional SN addition, Conditional PSCell addition, ...*) | This IE indicates the trigger for S-NG-RAN node Addition procedure. |
| ... | | | |
| Conditional SN Addition Information | O | | |
| >CPA Trigger | M | ENUMERATED (CPA initiation, CPA replace, ...) | |

Fig. 13B

9.1.2.2 S-NODE ADDITION REQUEST ACKNOWLEDGE

| IE/Groupe Name | Presence | Range | IE type and reference | Semantics description |
|---|---|---|---|---|
| ... | | | | |
| PDU Session Resources Admitted To Be Added List | | 1 | | |
| >PDU Session Resources Admitted To Be Added Item | | 1..<maxnoofPDUsessions> | | |
| >>PDU Session ID | M | | 9.2.3.18 | |
| >>... | | | | |
| >>*PDU Session Resource Setup Response Info - SN terminated* | *M* | | *9.2.1.6* | |
| >>... | | | | |

9.2.1.6 PDU Session Resource Setup Response Info – SN terminated

| IE/Groupe Name | Presence | Range | IE type and reference | Semantics description |
|---|---|---|---|---|
| ... | | | | |
| DRBs To Be Setup List | | 0..1 | | |
| >DRBs to Be Setup Item | | 1..\<maxno ofDRBs\> | | |
| >>DRB ID | M | | 9.2.3.33 | |
| >>SN UL PDCP UP TNL Information | M | | UP Transport Parameters 9.2.3.76 | S-NG-RAN node endpoint(s) of a DRB's Xn transport bearer at its PDCP resource. For delivery of UL PDUs. |
| >>... | | | | |
| >>*UL Configuration* | O | | 9.2.3.75 | *Information about UL usage in the M-NG-RAN node.* |
| >>*UL Configuration upon Conditional SN Mobility* | O | | 9.2.3.75 | *Information about UL usage in the M-NG-RAN node upon CPA execution.* |
| >>QoS Flows Mapped To DRB List | | 1 | | |
| >>>... | | | | |

1510 — *UL Configuration* row
1520 — *UL Configuration upon Conditional SN Mobility* row

Fig. 15

9.2.1.6 PDU Session Resource Setup Response Info – SN terminated

| IE/Groupe Name | Presence | Range | IE type and reference | Semantics description |
|---|---|---|---|---|
| ... | | | | |
| DRBs To Be Setup List | | 0..1 | | |
| >DRBs to Be Setup Item | | 1..\<maxno ofDRBs\> | | |
| >>DRB ID | M | | 9.2.3.33 | |
| >>SN UL PDCP UP TNL Information | M | | UP Transport Parameters 9.2.3.76 | S-NG-RAN node endpoint(s) of a DRB's Xn transport bearer at its PDCP resource. For delivery of UL PDUs. |
| >>SN UL PDCP UP TNL Information upon Conditional SN Mobility | O | | UP Transport Parameters 9.2.3.76 | S-NG-RAN node endpoint(s) of a DRB's Xn transport bearer at its PDCP resource. For delivery of UL PDUs upon CPA execution. |
| >... | | | | |
| >>UL Configuration | O | | 9.2.3.75 | Information about UL usage in the M-NG-RAN node. |
| >>QoS Flows Mapped To DRB List | | 1 | | |
| >>... | | | | |

Fig. 16

```
-- ASN1START
...
RRCConnectionReconfiguration-v17xy-IEs ::= SEQUENCE {
    conditionalReconfiguration-v17xy    ConditionalReconfiguration-v17xy    OPTIONAL, -- Need ON     1710
    tdm-PatternConfig2-r16              TDM-PatternConfig-r15               OPTIONAL, -- Need ON
    nonCriticalExtension                SEQUENCE {}                         OPTIONAL
}
...

ConditionalReconfiguration-v17xy ::= SEQUENCE {
    condReconfigurationToAddModList-v17xy    CondReconfigurationToAddModList-v17xy    OPTIONAL, -- Need ON     1720
    condReconfigurationToRemoveList-x16xy    CondReconfigurationToRemoveList-x16xy    OPTIONAL, -- Need ON
    ...
}
...
```

Fig. 17A

```
CondReconfigurationToAddModList-v17xy ::= SEQUENCE (SIZE (1.. maxCondConfig-r16)) OF CondReconfigurationAddMod-v17xt CondReconfigurationAddMod-v17xy ::= SEQUENCE {
    condReconfigurationId-r16       CondReconfigurationId-r16,
    triggerCondition-r16            SEQUENCE (SIZE (1..2)) OF MeasId                          1730
                                                    OPTIONAL, -- Cond CondReconfigurationAdd
    condReconfigurationToApply-v17xy    nr-Config-r15     OPTIONAL,-- Cond CondReconfigurationAdd   1740 nr-RadioBearerConfig1-r15       OCTET STRING            OPTIONAL,     -- Need ON           1750
    nr-RadioBearerConfig2-r15       OCTET STRING            OPTIONAL,     -- Need ON
    ...
}
...

-- ASN1STOP
```

Fig. 17B

```
-- ASN1START
 ...

RRCReconfiguration-v17xy-IEs ::=    SEQUENCE {
 ...
    conditionalReconfiguration-v17xy   ConditionalReconfiguration-v17xy   OPTIONAL, -- Need M    1810
 ...
    nonCriticalExtension               SEQUENCE {}                        OPTIONAL
}
 ...

ConditionalReconfiguration-v17xy ::= SEQUENCE {
    condReconfigToRemoveList-v17xy     CondReconfigToRemoveList-v17xy     OPTIONAL, -- Need N
    condReconfigToAddModList-v17xy     CondReconfigToAddModList-v17xy     OPTIONAL, -- Need N    1820
 ...
}
 ...
```

Fig. 18A

```
CondReconfigToAddModList-v17xy ::= SEQUENCE (SIZE (1.. maxNrofCondCells-r16)) OF CondReconfigToAddMod-v17xy CondReconfigToAddMod-v17xy ::=   SEQUENCE {
    condReconfigId-v17xy             CondReconfigId-v17xy,                                              1830
    condExecutionCond-v17xy          SEQUENCE (SIZE (1..2)) OF MeasId        OPTIONAL,    -- Cond condReconfigAdd
                                                                                                        1840
    mrdc-SecondaryCellGroupConfig    SetupRelease { MRDC-SecondaryCellGroupConfig }
                                                                             OPTIONAL,    -- Cond condReconfigAdd
    radioBearerConfig1               OCTET STRING (CONTAINING RadioBearerConfig)   OPTIONAL,   -- Need M
    radioBearerConfig2               OCTET STRING (CONTAINING RadioBearerConfig)   OPTIONAL,   -- Need M
    sk-Counter                       SK-Counter                              OPTIONAL,    -- Need N    1850
    ...
}

-- ASN1STOP
```

Fig. 18B

```
CondReconfigurationToAddModList-v17xy ::= SEQUENCE (SIZE (1.. maxCondConfig-r16)) OF CondReconfigurationAddMod-v17xt CondReconfigurationAddMod-v17xy ::= SEQUENCE {
    condReconfigurationId-r16       CondReconfigurationId-r16,
    triggerCondition-r16            SEQUENCE (SIZE (1..2)) OF MeasId
                                    OPTIONAL, -- Cond CondReconfigurationAdd
                                                                          ⌐1940
    condReconfigurationToApply-v17xy ::= SEQUENCE {
        masterConfig-r17       RadioResourceConfigDedicated OPTIONAL, -- Need M   ⌐1950
        secondaryConfig-r17                 OPTIONAL, -- Cond CondReconfigurationAdd  ⌐1960
    nr-Config-r15               OCTET STRING
    nr-RadioBearerConfig1-r15   OCTET STRING         OPTIONAL,   -- Need ON
    nr-RadioBearerConfig2-r15   OCTET STRING         OPTIONAL,   -- Need ON
    ...
}
...
-- ASN1STOP
```

Fig. 19

```
CondReconfigToAddModList-v17xy ::= SEQUENCE (SIZE (1.. maxNrofCondCells-r16)) OF CondReconfigToAddMod-v17xy CondReconfigToAddMod-v17xy ::= SEQUENCE {
    condReconfigId-v17xy            CondReconfigId-v17xy,
    condExecutionCond-v17xy         SEQUENCE (SIZE (1..2)) OF MeasId              OPTIONAL,   -- Cond condReconfigAdd
    masterCellGroup                 OCTET STRING (CONTAINING CellGroupConfig)     OPTIONAL,   -- Need M                  ⌐ 2040
    mrdc-SecondaryCellGroupConfig   SetupRelease { MRDC-SecondaryCellGroupConfig }                                        ⌐ 2050
                                                                                  OPTIONAL,   -- Cond condReconfigAdd
    radioBearerConfig1              OCTET STRING (CONTAINING RadioBearerConfig)   OPTIONAL,   -- Need M
    radioBearerConfig2              OCTET STRING (CONTAINING RadioBearerConfig)   OPTIONAL,   -- Need M
    sk-Counter                      SK-Counter                                    OPTIONAL,   -- Need N
    ...
}

...

-- ASN1STOP
```

Fig. 20

RADIO ACCESS NETWORK NODE, USER EQUIPMENT, AND METHODS THEREOF

This application is a National Stage Entry of PCT/JP2021/019544 filed on May 24, 2021, which claims priority from Japanese Patent Application 2020-133305 filed on Aug. 5, 2020, the contents of all of which are incorporated herein by reference, in their entirety.

TECHNICAL FIELD

The present disclosure relates to a radio communication system, and in particular, to a Secondary Cell Group (SCG) addition in multi-connectivity (e.g., Dual Connectivity).

BACKGROUND ART

The 3rd Generation Partnership Project (3GPP) has started to work on Release 17. Release 17 plans to support Conditional Primary Secondary Cell (PSCell) Addition (CPA) (see, for example, Non Patent Literature 1 to 3). CPA is a PSCell addition procedure that is executed only when one or more execution conditions are met.

In some implementations for CPA, a serving Radio Access Network (RAN) node, which is a future Master Node (MN), determines a CPA execution condition. The serving RAN node then transmits a Radio Resource Control (RRC) message containing the CPA execution condition and an SCG configuration to a User Equipment (UE). The SCG configuration is generated by a candidate Secondary Node (SN) and sent to the serving RAN node (i.e., future MN). In response to receiving the RRC message, the UE starts evaluating the CPA execution condition for the candidate PSCell. If the CPA execution condition is satisfied, the UE initiates synchronization to the candidate PSCell via a random access procedure.

CITATION LIST

Non Patent Literature

[Non Patent Literature 1] CATT, "Draft stage-2 CR for Conditional PSCell Addition/Change", R2-1915985, 3GPP TSG-RAN2 Meeting #108, Reno, USA, 18-22 Nov. 2019

[Non Patent Literature 2] CATT, "TP for TS36423 BLCR Conditional SN Addition &Change Procedure", R3-196728, 3GPP TSG-RAN WG3 Meeting #106, Reno, USA, 18-22 Nov. 2019

[Non Patent Literature 3] NTT DOCOMO, INC., "(TP for NR_Mob_enh-Core BL CR for TS 36.423) Conditional PScell addition", R3-196975, 3GPP TSG-RAN WG3 Meeting #106, Reno, USA, 18-22 Nov. 2019

SUMMARY OF INVENTION

Technical Problem

The inventors have studied CPA and found various problems. One of these problems is related to a CPA failure. The CPA is expected to involve setup of a data radio bearer(s) (i.e., SCG Data Radio Bearer (DRB) or split DRB or both) that uses radio resources of an SCG. An SCG DRB is a data radio bearer with a Radio Link Control (RLC) bearer only in an SCG associated with the SN. On the other hand, a split DRB is a data radio bearer having both an RLC bearer in a Master Cell Group (MCG) associated with the MN and an RLC bearer in an SCG. In addition, an SCG DRB or split DRB to be configured in CPA may be an SN terminated DRB. The SN terminated DRB is a data radio bearer for which a Packet Data Convergence Protocol (PDCP) is located in the SN. If CPA with setup of an SN terminated SCG bearer or SN terminated split bearer fails, this may result in a long interruption in data communication.

One of the objects to be attained by embodiments disclosed herein is to provide apparatuses, methods, and programs that contribute to mitigating a communication continuity problem caused by a CPA failure. It should be noted that the above-described object is merely one of the objects to be attained by the embodiments disclosed herein. Other objects or problems and novel features will be made apparent from the following description and the accompanying drawings.

Solution to Problem

A first aspect is directed to a first RAN node configured to operate as a master node associated with an MCG in dual connectivity for a UE. The first RAN node includes at least one memory and at least one processor coupled to the at least one memory. The at least one processor is configured to request a conditional PSCell addition, via an SN ADDITION REQUEST message, to a candidate secondary node. The at least one processor is further configured to request the candidate secondary node, via the SN ADDITION REQUEST message, to configure an SN terminated MCG bearer that is a radio bearer terminated at the candidate secondary node and using radio resources of the MCG but not using radio resources of an SCG associated with the candidate secondary node.

A second aspect is directed to a second RAN node configured to operate as a secondary node associated with an SCG in dual connectivity for a UE. The second RAN node includes at least one memory and at least one processor coupled to the at least one memory. The at least one processor is configured to receive, from a master node, an SN ADDITION REQUEST message including a request for a conditional PSCell addition and including a request for an SCG terminated bearer that is a radio bearer terminated at the second RAN node. The at least one processor is further configured to send an SN ADDITION REQUEST ACKNOWLEDGE message to the master node in response to the SN ADDITION REQUEST message. The SN ADDITION REQUEST ACKNOWLEDGE message contains an SCG configuration of the SCG including a candidate PSCell for the conditional PSCell addition and a radio bearer configuration regarding an SN terminated MCG bearer that is a radio bearer terminated at the second RAN node and using radio resources of an MCG associated with the master node but not using radio resources of the SCG.

A third aspect is directed to a UE. The UE includes at least one memory and at least one processor coupled to the at least one memory. The at least one processor is configured to receive an MN RRC Reconfiguration message from a serving RAN node. The MN RRC Reconfiguration message contains an execution condition for a conditional PSCell addition, a radio bearer configuration of an SN terminated MCG bearer, and an SCG configuration of an SCG including a candidate PSCell for the conditional PSCell addition. The at least one processor is configured to establish the SN terminated MCG bearer and start evaluating the execution condition in response to receiving the MN RRC Reconfiguration message.

A fourth aspect is directed to a method performed by a first RAN node configured to operate as a master node associated with an MCG in dual connectivity for a UE. The method includes the following steps:

(a) requesting a conditional PSCell addition, via an SN ADDITION REQUEST message, to a candidate secondary node; and (b) requesting the candidate secondary node, via the SN ADDITION REQUEST message, to configure an SN terminated MCG bearer, the SN terminated MCG bearer being a radio bearer terminated at the candidate secondary node and using radio resources of the MCG but not using radio resources of an SCG associated with the candidate secondary node.

A fifth aspect is directed to a method performed by a second RAN node configured to operate as a secondary node associated with an SCG in dual connectivity for a UE. The method includes the following steps:

(a) receiving an SN ADDITION REQUEST message from a master node, the SN ADDITION REQUEST message including a request for a conditional PSCell addition and a request for an SCG terminated bearer that is a radio bearer terminated at the second RAN node; and (b) sending an SN ADDITION REQUEST ACKNOWLEDGE message to the master node in response to the SN ADDITION REQUEST message, wherein he SN ADDITION REQUEST ACKNOWLEDGE message contains an SCG configuration of the SCG including a candidate PSCell for the conditional PSCell addition and a radio bearer configuration regarding an SN terminated MCG bearer that is a radio bearer terminated at the second RAN node and using radio resources of an MCG associated with the master node but not using radio resources of the SCG.

A sixth aspect is directed to a method performed by a UE. The method includes the following steps:

(a) receiving an MN RRC Reconfiguration message from a serving RAN node, wherein the MN RRC Reconfiguration message contains an execution condition for a conditional PSCell addition, a radio bearer configuration of an SN terminated MCG bearer, and an SCG configuration of an SCG including a candidate PSCell for the conditional PSCell addition; and (b) establishing the SN terminated MCG bearer and starting to evaluate the execution condition in response to receiving the MN RRC Reconfiguration message.

A seventh aspect is directed to a program. The program includes a set of instructions (software codes) that, when loaded into a computer, causes the computer to perform the method according to the fourth, fifth, or sixth aspect.

Advantageous Effects of Invention

According to the above aspects, it is possible to provide apparatuses, methods, and programs that contribute to mitigating a communication continuity problem caused by a CPA failure.

BRIEF DESCRIPTION OF DRAWINGS

FIG. 10A shows an example of a format of an SGNB ADDITION REQUEST message according to an embodiment;

FIG. 10B shows an example of a format of an SGNB ADDITION REQUEST message according to an embodiment;

FIG. 11A shows an example of a format of an SGNB ADDITION REQUEST message according to an embodiment;

FIG. 11B shows an example of a format of an SGNB ADDITION REQUEST message according to an embodiment;

FIG. 12A shows an example of a format of an S-NODE ADDITION REQUEST message according to an embodiment;

FIG. 12B shows an example of a format of an S-NODE ADDITION REQUEST message according to an embodiment;

FIG. 13A shows an example of a format of an S-NODE ADDITION REQUEST message according to an embodiment;

FIG. 13B shows an example of a format of an S-NODE ADDITION REQUEST message according to an embodiment;

FIG. 14 shows an example of a format of an S-NODE ADDITION REQUEST ACKNOWLEDGE message according to an embodiment;

FIG. 15 shows an example of a format of a "PDU Session Resource Setup Response Info-SN terminated" information element according to an embodiment;

FIG. 16 shows an example of a format of a "PDU Session Resource Setup Response Info-SN terminated" information element according to an embodiment;

FIG. 17A shows an example of a format of an RRC Reconfiguration message according to an embodiment;

FIG. 17B shows an example of a format of an RRC Reconfiguration message according to an embodiment;

FIG. 18A shows an example of a format of an RRC Reconfiguration message according to an embodiment;

FIG. 18B shows an example of a format of an RRC Reconfiguration message according to an embodiment;

FIG. 19 shows an example of a format of an RRC Reconfiguration message according to an embodiment;

FIG. 20 shows an example of a format of an RRC Reconfiguration message according to an embodiment;

DESCRIPTION OF EMBODIMENT

Specific embodiments will be described hereinafter in detail with reference to the drawings. The same or corresponding elements are denoted by the same symbols throughout the drawings, and duplicated explanations are omitted as appropriate for the sake of clarity.

Each of the embodiments described below may be used individually, or two or more of the embodiments may be combined with one another as appropriate. These embodiments include novel features different from each other. Accordingly, these embodiments contribute to attaining objects or solving problems different from one another and also contribute to obtaining advantages different from one another.

The embodiments described below are primarily for the 3GPP Long Term Evolution (LTE) system and fifth generation mobile communications system (5G system). However, these embodiments may be applied to other radio communication systems that support technologies similar to the multi-connectivity (e.g., Dual Connectivity) of the 3GPP. The term "LTE" as used in the present specification includes improvements and enhancements of LTE and LTE-Advanced to enable interworking with 5G systems, unless otherwise noted.

First Embodiment

Figure 1:
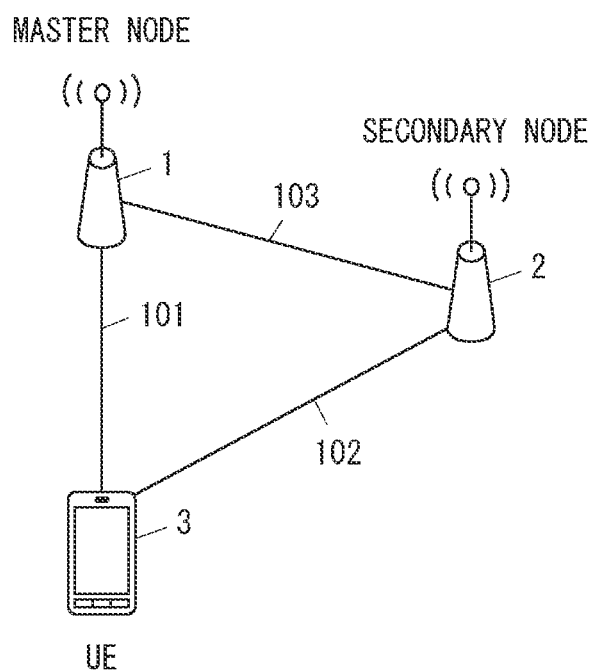
FIG. 1 shows a configuration example of a radio communication network according to an embodiment.

FIG. 1 shows a configuration example of a radio communication network according to embodiments including this embodiment. In the example of FIG. 1, the radio communication network includes a RAN node 1, a RAN node 2, and a UE 3. Each element (or network function) shown in FIG. 1 can be implemented, for example, as a network element on dedicated hardware, as a software instance running on dedicated hardware, or as a virtualized function instantiated on an application platform.

The RAN node 1 may be, for example, an LTE eNodeB (eNB) or an NR gNodeB (gNB). The RAN node 1 may be a Central Unit (e.g., eNB-CU or gNB-CU) in a cloud RAN (C-RAN) deployment, or a combination of a CU and one or more Distributed Units (e.g., eNB-DUs or gNB-DUs). The C-RAN is also referred to as CU/DU split. The CU may include a Control Plane (CP) Unit (e.g., gNB-CU-CP) and one or more User Plane (UP) Units (e.g., gNB-CU-UPs). Accordingly, the RAN node 1 may be a CU-CP or a combination of a CU-CP and a CU-UP(s). Similarly, the RAN node 2 may be an eNB or a gNB. The RAN node 2 may be a Central Unit (CU) or a combination of a CU and one or more Distributed Units (DUs). The RAN node 2 may be a CU-CP or a combination of a CU-CP and a CU-UP(s).

Each RAN node may be an Evolved Universal Mobile Telecommunications System (UMTS) Terrestrial Radio Access Network (EUTRAN) node or an NG-RAN (Next generation Radio Access Network) node. The EUTRAN node may be an eNB or an en-gNB. The NG-RAN node may be a gNB or an ng-eNB. The en-gNB is a node that provides NR user plane and control plane protocol terminations towards a UE and acts as a Secondary Node (SN) in E-UTRA-NR Dual Connectivity (EN-DC). The ng-eNB is a node that provides E-UTRA user plane and control plane protocol terminations towards a UE and is connected to a 5GC via an NG interface. The Radio Access Technology (RAT) of the RAN node 1 may be different from that of the RAN node 2.

The RAN node 1 and the RAN node 2 communicate with each other via an inter-node interface (i.e., X2 interface or Xn interface) 103. The RAN node 1 and the RAN node 2 operate as a Master Node (MN) and a Secondary Node (SN) in dual connectivity, respectively. The UE 3 communicates with the MN 1 and the SN 2 via air interfaces 101 and 102, and performs dual connectivity with a Master Cell Group (MCG) and a Secondary Cell Group (SCG).

This dual connectivity may be Multi-Radio Dual Connectivity (MR-DC). The MR-DC includes E-UTRA-NR Dual Connectivity (EN-DC), NG-RAN E-UTRA-NR Dual Connectivity (NGEN-DC), NR-E-UTRA Dual Connectivity (NE-DC), and NR-NR Dual Connectivity (NR-DC). Accordingly, the MN 1 may be one of a Master eNB (in EN-DC), a Master ng-eNB (in NGEN-DC), and a Master gNB (in NR-DC and NE-DC). Similarly, the SN 2 may be one of an en-gNB (in EN-DC), a Secondary ng-eNB (in NE-DC), and a Secondary gNB (in NR-DC and NGEN-DC). In EN-DC, the UE 3 is connected to an eNB acting as the MN 1 and to an en-gNB acting as the SN 2. In NGEN-DC, the UE 3 is connected to a ng-eNB acting as the MN 1 and to a gNB acting as the SN 2. In NE-DC, the UE 3 is connected to a gNB acting as the MN 1 and to an ng-eNB acting as the SN 2. In NR-DC, the UE 3 is connected to one gNB (or gNB-DU) acting as the MN 1 and to another gNB (or gNB-DU) acting as the SN 2.

The MCG is a group of serving cells associated with (or provided by) the MN 1, including the SpCell (i.e., Primary Cell (PCell)) and optionally one or more Secondary Cells (SCells). Meanwhile, the SCG is a group of serving cells associated with (or provided by) the SN 2 and includes the primary cell of the SCG (i.e., Primary SCG Cell (PSCell)) and optionally one or more Secondary Cells (SCells). The PSCell is the Special Cell (SpCell) of the SCG and supports Physical Uplink Control Channel (PUCCH) transmission and contention-based Random Access. In LTE (e.g., LTE-DC and NE-DC), PSCell may be an abbreviation of Primary SCell.

As used in the present specification, the term "primary secondary cell" and its abbreviation "PSCell" stands for a cell that is included in a cell group provided by an SN in dual connectivity, has an uplink component carrier, and is configured with uplink control channel (e.g., PUCCH) resources. Specifically, the term "primary secondary cell" and its abbreviation "PSCell" may refer to a Primary SCG Cell of a cell group provided by an SN (e.g., en-gNB in EN-DC, gNB in NGEN-DC, or gNB in NR-DC) supporting 5G NR, or may refer to a Primary SCell of a cell group provided by an SN (e.g., eNB in LTE DC, or ng-eNB in NE-DC) supporting E-UTRA.

Figure 2:
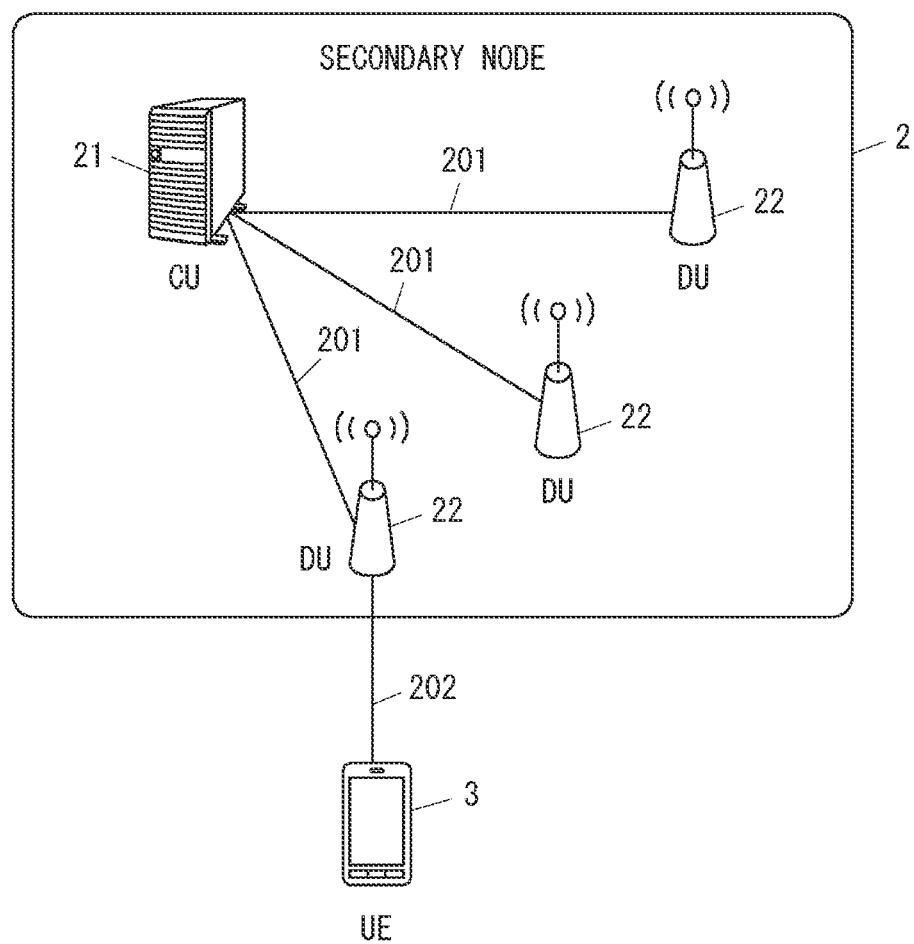
FIG. 2 shows a configuration example of a secondary node according to an embodiment.

FIG. 2 shows a configuration example of the SN 2. Each element (network function) shown in FIG. 2 can be implemented, for example, as a network element on dedicated hardware, as a software instance running on dedicated hardware, or as a virtualized function instantiated on an application platform. The SN 2 may include, but is not limited to, a CU 21 and one or more DUs 22 as shown in FIG. 2. The CU 21 is connected each DU 22 via an interface 201. The UE 3 is connected to at least one DU 22 via at least one air interface 202.

The CU 21 may be a logical node that hosts Radio Resource Control (RRC), Service Data Adaptation Protocol (SDAP), and Packet Data Convergence Protocol (PDCP) protocols of the gNB (or hosts the RRC and PDCP protocols of the gNB). The DU 22 may be a logical node that hosts Radio Link Control (RLC), Medium Access Control (MAC), and Physical (PHY) layers of the gNB. If the CU 21 is a gNB-CU and the DUs 22 are gNB-DUs, then the interfaces 201 may be F1 interfaces. The CU 21 may include a CU-CP and a CU-UP(s).

The following describes a Conditional PSCell Addition (CPA) procedure according to this embodiment. Assume that the RAN node 1 is a serving node or future potential MN for the UE 3, the RAN node 2 is a candidate SN, and any cell associated with the RAN node 2 is a candidate PSCell. In some implementations, the MN 1 determines a CPA execution condition. The RAN node 1 then transmits an RRC message, containing the CPA execution condition and a SCG configuration, to the UE 3. The SCG configuration is generated by the candidate SN 2 and sent to the MN 1. The SCG configuration may be referred to as a CPA configuration. In EN-DC and NGEN-DC, the RRC message is an E-UTRA RRC message (e.g., RRC Connection Reconfiguration message). On the other hand, in NE-DC and NR-DC, the RRC message is an NR RRC message (e.g., NR RRC Reconfiguration message). In response to receiving the RRC message, the UE 3 starts evaluating the CPA execution condition for the candidate PSCell. The CPA execution condition may be the same as Event A4 (Neighbour becomes better than threshold) or Event B1 (Inter RAT neighbour becomes better than threshold) of the trigger events for LTE measurement reporting. If the CPA execution condition is satisfied, the UE 3 initiates synchronization to the candidate PSCell via a random access procedure.

The CPA procedure according to this embodiment involves setup of an SN terminated MCG DRB. The SN terminated MCG DRB is a data radio bearer terminated at the SN 2 and using radio resources of the MCG associated with the MN 1 but not using radio resources of the SCG associated with the SN 2. In other words, the SN terminated MCG DRB is a data radio bearer for which PDCP is located in the SN 2 and having an RLC bearer only in the MCG associated with the MN 1.

More specifically, in the CPA procedure, when the MN 1 requests CPA via an SN ADDITION REQUEST message to the (candidate) SN 2, it further requests the SN 2 to configure an SN terminated MCG DRB via the SN ADDITION REQUEST message. In other words, the MN 1 requests the SN 2 via a single SN ADDITION REQUEST message to immediately configure an SN terminated MCG DRB and to prepare CPA. Upon reception of the SN ADDITION REQUEST message, the SN 2 recognizes that the PDCP and X2-U (or Xn-U) processing regarding the SN terminated MCG DRB need to be started, and in addition that CPA needs to be prepared for the UE 3. Accordingly, the SN 2 provides the PDCP and X2-U (or Xn-U) processing regarding the SN terminated MCG DRB for the UE 3 and prepares the CPA for the UE 3.

Furthermore, the MN 1 sends a request for configuring the SN terminated MCG DRB to the UE 3 via an MN RRC message (e.g., RRC Reconfiguration Messages) together with the CPA execution condition and the CPA configuration. In response to receiving the MN RRC message, the UE 3 establishes the SN terminated MCG bearer and starts evaluating the CPA execution condition.

According to this CPA procedure, the SN terminated MCG DRB is first added and then the CPA is executed when the execution condition is satisfied. In other words, in this CPA procedure, the SN terminated MCG DRB is established prior to the execution of the CPA. This CPA procedure can provide, for example, the following advantages. In some implementations, if the CPA execution fails and thus a (SN terminated) SCG DRB or (SN terminated) split DRB that would have been configured in the CPA is not available, the UE 3 can still continue to use the SN terminated MCG DRB. This can contribute to mitigating communication continuity problems caused by a CPA failure.

Figure 3:
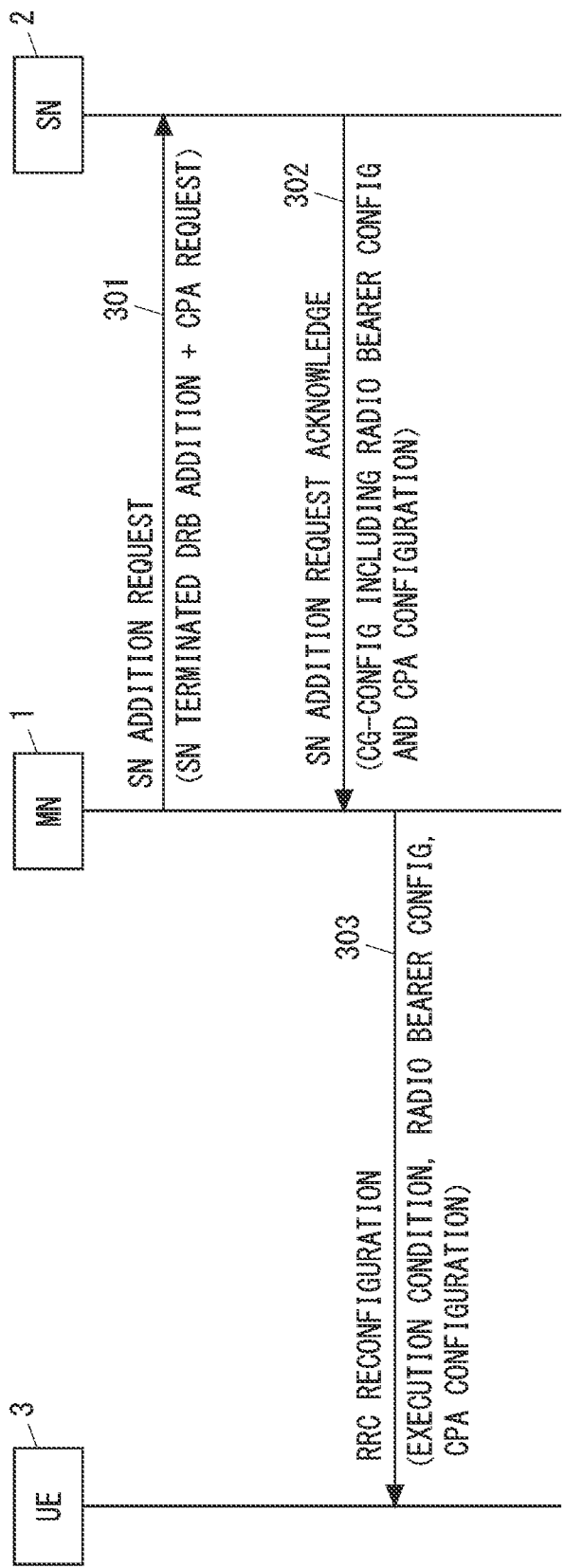
FIG. 3 is a sequence diagram showing an example of signaling according to an embodiment.

FIG. 3 shows an example of signaling for the CPA procedure according to this embodiment. In Step 301, the MN 1 sends an SN ADDITION REQUEST message to the SN 2. The SN ADDITION REQUEST message indicates an addition of at least one SN terminated DRB and indicates a CPA request. That is, the MN 1 requests the (candidate) SN 2 to add an SN terminated DRB and to execute CPA via the SN ADDITION REQUEST message.

In Step 302, the SN 2 generates a radio bearer configuration regarding the SN terminated MCG DRB and further generates a CPA configuration. The radio bearer configuration regarding the SN terminated MCG DRB includes a PDCP configuration. The CPA configuration includes an SCG radio configuration. More specifically, in the case of EN-DC, the MN 1 (eNB) explicitly requests the SN 2 (en-gNB) to configure the SN terminated MCG DRB via the SN ADDITION REQUEST message. In this case, the SN 2 generates the radio bearer configuration for the SN terminated MCG DRB in accordance with the request of the MN 1. Alternatively, in MR-DC with 5GC (i.e., NGEN-DC, NE-DC or NR-DC), the MN 1 (ng-eNB or gNB) may inform the SN 2 (gNB or ng-eNB) via the SN ADDITION REQUEST message that an SN terminated DRB needs to be configured and that MCG resources are available for this purpose. In this case, the SN 2 may decide to configure the SN terminated MCG DRB. The SN 2 sends an SN ADDITION REQUEST ACKNOWLEDGE message to the MN 1. The SN ADDITION REQUEST ACKNOWLEDGE message contains the radio bearer configuration (e.g., Radio Bearer Config) regarding the SN terminated MCG DRB and contains the CPA configuration (e.g., SCG Cell Group Configuration). The radio bearer configuration and CPA configuration may be contained in a CG-Config message. The CG-Config message is an inter-node RRC message used to transfer an SCG radio configuration generated by the SN to the MN. If an MN terminated MCG DRB that has already been established in the MN 1 is to be transferred to the SN 2, a CG-ConfigInfo message contained in the SN ADDITION REQUEST message may include configuration information about that MN terminated MCG DRB for reference by the SN 2.

In Step 303, the MN 1 generates a CPA execution condition (e.g., condExecutionCond) for the CPA configuration received from the SN 2. The MN 1 then transmits an MN RRC Reconfiguration message to the UE 3. The MN RRC Reconfiguration message may be an E-UTRA RRC Connection Reconfiguration message in EN-DC and NGEN-DC, or an NR RRC Reconfiguration message in NE-DC and NR-DC. The MN RRC Reconfiguration message contains the radio bearer configuration of the SN terminated MCG DRB for which PDCP is located in the SN 2, the CPA execution condition, and the CPA configuration (i.e., SCG configuration associated with the SN2). More specifically, the MN RRC Reconfiguration message may include a ConditionalReconfiguration Information Element (IE). The ConditionalReconfiguration IE may contain the CPA execution condition, and in addition contain CPA configuration information (e.g., condRRCReconfig) including as a container (octet string) the CPA configuration received from the SN 2. In response to receiving the MN RRC Reconfiguration message, the UE 3 establishes the SN terminated MCG DRB and starts evaluating the CPA execution condition.

Figure 4:
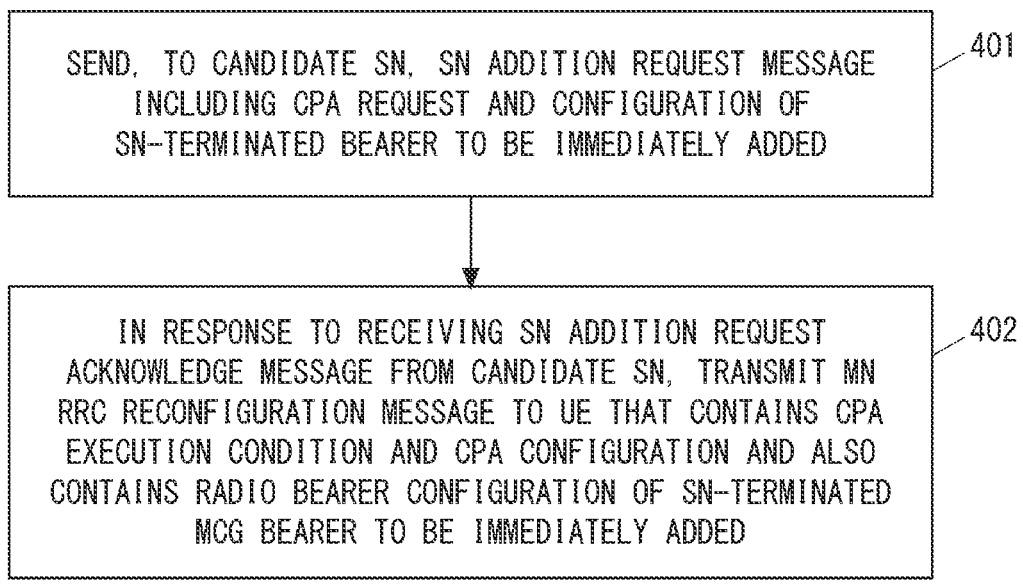
FIG. 4 is a flowchart showing an example of processing performed by a master node according to an embodiment.

FIG. 4 is a flowchart showing an example of the operation of the MN 1. Step 401 corresponds to Step 301 in FIG. 3. Specifically, in Step 401, the MN 1 sends to the (candidate) SN 2 an SN ADDITION REQUEST message that includes a request for CPA and a configuration of an SN terminated (MCG) DRB to be immediately added. In other words, the MN 1 requests the SN 2 for immediate configuration of an SN terminated (MCG) DRB and for CPA via the SN ADDITION REQUEST message. Step 402 corresponds to Step 303 in FIG. 3. That is, in response to receiving an SN ADDITION REQUEST ACKNOWLEDGE message from the SN 2, the MN 1 transmits an MN RRC Reconfiguration message to the UE 3. The MN RRC Reconfiguration message contains a radio bearer configuration of an SN terminated MCG DRB for which PDCP is located in the SN 2, a CPA execution condition, and a CPA configuration (i.e., SCG configuration associated with the SN2). In other words, the MN 1 requests the UE 3 to perform the radio bearer configuration regarding an SN terminated MCG DRB and to perform CPA via the MN RRC Reconfiguration message.

Figure 5:
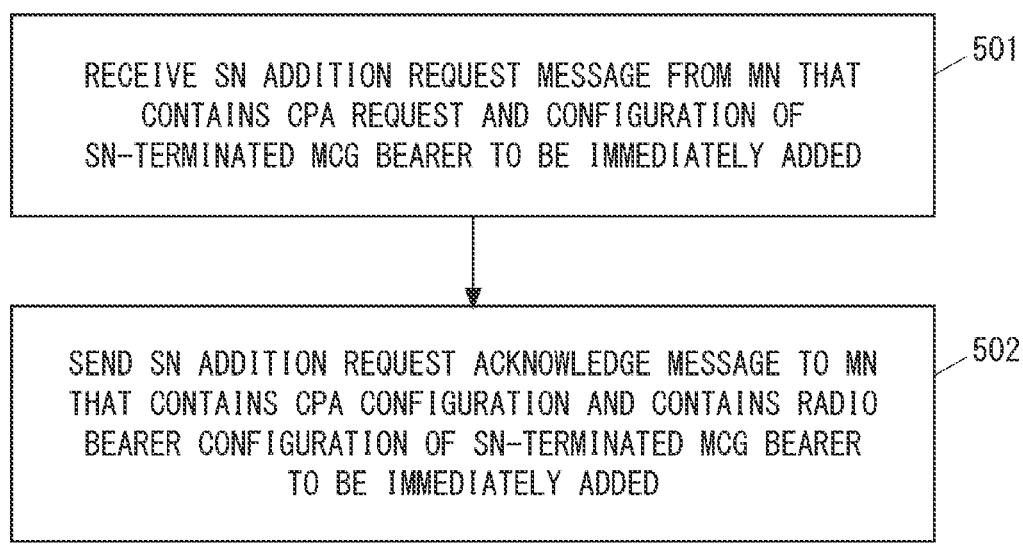
FIG. 5 is a flowchart showing an example of processing performed by a secondary node according to an embodiment.

FIG. 5 is a flowchart showing an example of the operation of the SN 2. Step 501 corresponds to Step 301 in FIG. 3. Namely, the SN 2 receives from the MN 1 an SN ADDITION REQUEST message including a request for CPA and a configuration of an SN terminated (MCG) DRB to be immediately added. In other words, the SN ADDITION REQUEST message requests the SN 2 for CPA, and in addition requests the SN 2 to immediately configure an SN terminated (MCG) DRB. Step 502 corresponds to Step 302 in FIG. 3. That is, the SN 2 sends an SN ADDITION REQUEST ACKNOWLEDGE message to the MN 1, which contains a radio bearer configuration for an SN terminated MCG DRB and a CPA configuration.

Figure 6:
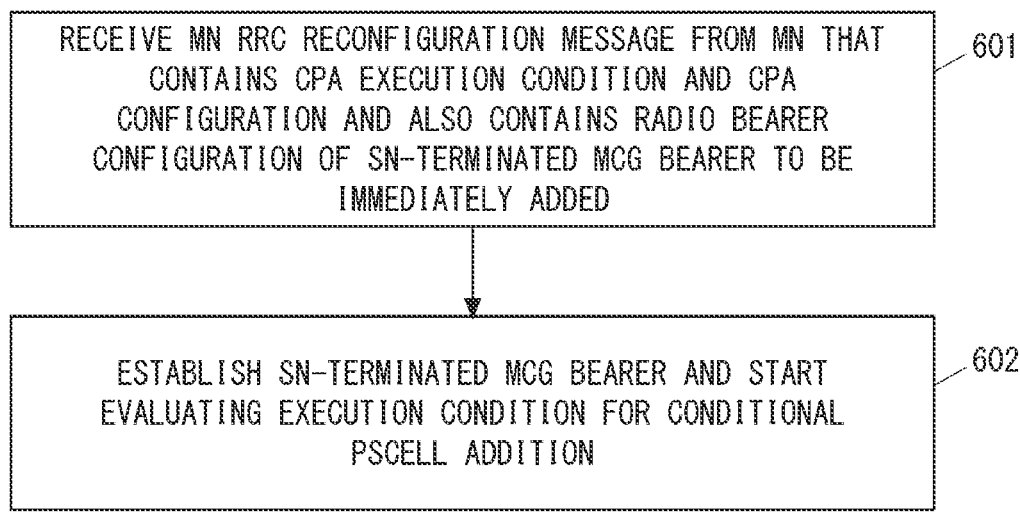
FIG. 6 is a flowchart showing an example of processing performed by a UE according to an embodiment.

FIG. 6 is a flowchart showing an example of the operation of the UE 3. Step 601 corresponds to Step 303 in FIG. 3. That is, the UE 3 receives an MN RRC Reconfiguration message from the MN 1. The MN RRC Reconfiguration message contains a CPA execution condition and a CPA configuration. In addition, the MN RRC Reconfiguration message contains a radio bearer configuration regarding an SN terminated MCG DRB to be immediately added. In Step 602, the UE 3 establishes the SN terminated MCG DRB and starts evaluating the CPA execution condition.

The CPA procedure described in this embodiment may be modified as follows. The CPA configuration generated by the SN 2 may include configurations of one or more SN terminated DRBs using SCG radio resources. The SN terminated DRB(s) using SCG radio resources may include an SN terminated split DRB(s) or an SN terminated SCG DRB(s) or both. The MN 1 may request the SN 2 to configure an SN terminated split DRB(s) or an SN terminated SCG DRB(s) or both, via the SN ADDITION REQUEST message (Step 301) for the CPA request.

The CPA configuration generated by the SN 2 may include a configuration for changing, upon CPA execution, a bearer type of the SN terminated MCG DRB, which is to be immediately configured, into SN terminated split DRB or SN terminated SCG DRB. The MN 1 may request this change of the bearer type to the SN 2 via the SN ADDITION REQUEST message (Step 301) for the CPA request.

The MN 1 may provide multiple CPA configurations for multiple candidate PSCells to the UE 3. In this case, the immediate configuration of an SN terminated MCG DRB described above may be applied to one of the one or more SNs associated with the multiple candidate PSCells. For example, the MN 1 may request one or more SNs for CPA configurations for multiple candidate PSCells. At this time, the MN 1 may request a specific SN to perform both the immediate configuration of an SN terminated MCG DRB and the CPA configuration, and may request the other SN(s) to perform only the CPA configuration.

Second Embodiment

This embodiment provides a specific example of the conditional PSCell addition (CPA) described in the first embodiment. A configuration example of a radio communication network according to this embodiment may be the same as those shown in FIGS. 1 and 2.

Figure 7:
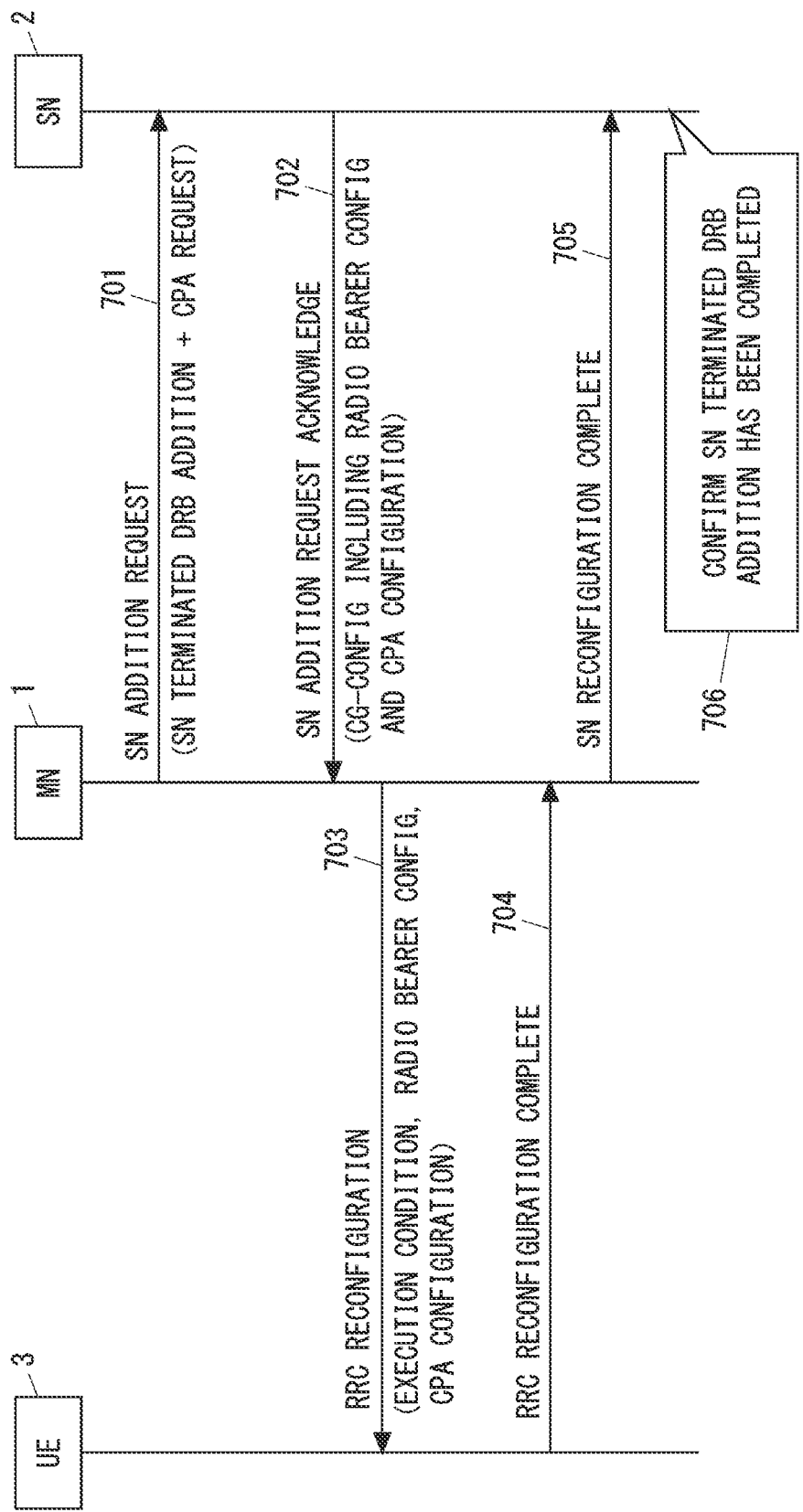
FIG. 7 is a sequence diagram showing an example of signaling according to an embodiment.

FIG. 7 shows an example of signaling for a CPA procedure according to this embodiment. Steps 701 to 703 are similar to Steps 301 to 303 in FIG. 3. In Step 704, in response to receiving the MN RRC Reconfiguration message (Step 703), the UE 3 transmits an MN RRC Reconfiguration Complete message to the MN 1. In Step 705, the MN 1 sends an SN RECONFIGURATION COMPLETE message to the SN 2 in response to receiving the MN RRC Reconfiguration Complete message. This allows the SN 2 to recognize in Step 706 that only the configuration of the SN terminated MCG DRB by the UE 3 has been completed (and that the CPA has not yet been performed), in response to receiving the SN RECONFIGURATION COMPLETE message. In other words, the MN 1 implicitly informs the SN 2 via the SN RECONFIGURATION COMPLETE message that the UE 3 has successfully established the SN terminated MCG DRB.

Third Embodiment

This embodiment provides a specific example of the conditional PSCell addition (CPA) described in the first embodiment. A configuration example of a radio communication network according to this embodiment may be the same as those shown in FIGS. 1 and 2.

Figure 8:
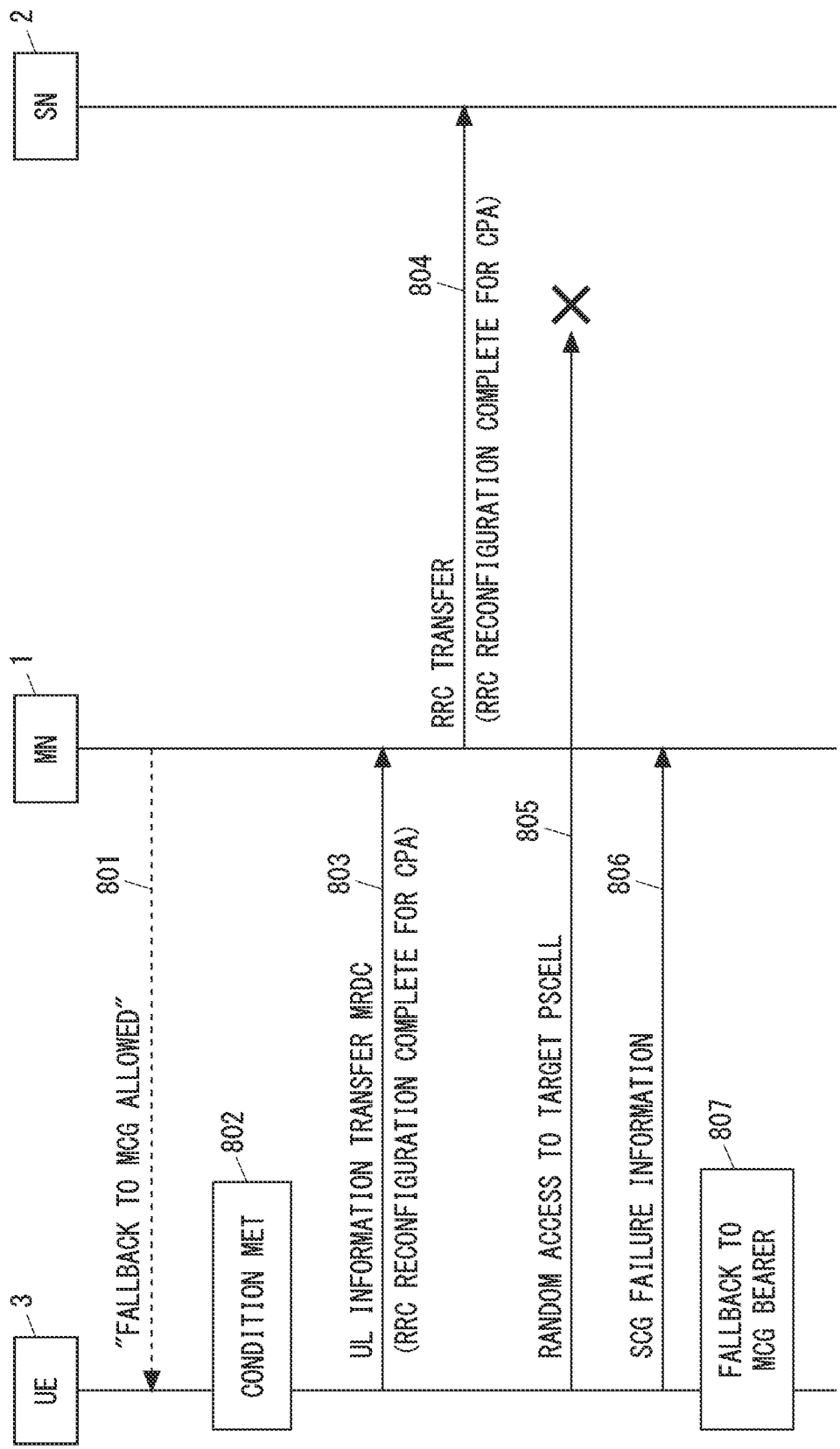
FIG. 8 is a sequence diagram showing an example of signaling according to an embodiment.

FIG. 8 shows an example of signaling for the CPA procedure according to this embodiment. FIG. 8 shows a CPA execution phase and an operation when a CPA failure occurs. In Step 802, the UE 3 determines (or detects) that a CPA execution condition is met. In Step 803, in response to the satisfaction of the CPA execution condition, the UE 3 sends an MN RRC message containing an SN RRC response message to the MN 1. The MN RRC message may be, for example, a UL Information Transfer MRDC message. The SN RRC response message may be, for example, an SN RRC RECONFIGURATION COMPLETE message. In Step 804, the MN 1 forwards the SN RRC response message received from the UE 3 to the SN 2.

In Step 805, in response to the satisfaction of the CPA execution condition, the UE 3 starts random access to the candidate PSCell associated with the SN 2. The order of Steps 803 and 805 is not restricted. Step 805 may be started before Step 803.

In the example of FIG. 8, the random access in Step 805 ends in failure. For example, the UE 3 may detect a random access failure when it cannot receive a second message (random access response) c from the SN 2. The UE 3 may detect other types of CPA execution failures (e.g., radio link failure, or reconfiguration with sync failure). In Step 806, the UE 3 reports the CPA execution failure to the MN 1. The UE 3 may transmit an SCG Failure Information message indicating the CPA execution failure to the MN 1.

In Step 807, the UE 3 falls back to the SCG terminated MCG DRB established before the CPA execution in response to the detection of the CPA execution failure. Similarly, the MN 1 also falls back to the SCG terminated MCG DRB established before the CPA execution. Specifically, if the CPA execution fails, the UE 3 and the MN 1 continue data communication through the SN terminated MCG DRB established before the CPA execution. If the failed CPA involved a bearer type change of the SN terminated MCG DRB, the UE 3 and the MN 1 may change the SN terminated split DRB or SN terminated SCG DRB back to the SN terminated MCG DRB. More specifically, if the failed CPA involved a change from the SN terminated MCG DRB to an SN terminated split DRB, the UE 3 and the MN 1 may continue data reception via the MCG part of the split bearer. Alternatively, the UE 3 may autonomously perform a bearer type change from the SN terminated split DRB to the SN terminated MCG DRB, without an explicit RRC Reconfiguration. If the failed CPA involved a change from the SN terminated MCG DRB to an SN terminated SCG DRB, the MN 1 may reconfigure the MCG resources to the UE 3 upon reception of SCG Failure Information. The UE 3 may perform the fallback to the SCG terminated MCG DRB described above only when the UE 3 has received a permission (e.g., Fallback to MCG Allowed) from the MN 1 in advance (Step 801).

Fourth Embodiment

This embodiment provides a specific example of the conditional PSCell addition (CPA) described in the first embodiment. A configuration example of a radio communication network according to this embodiment may be the same as those shown in FIGS. 1 and 2.

Figure 9:
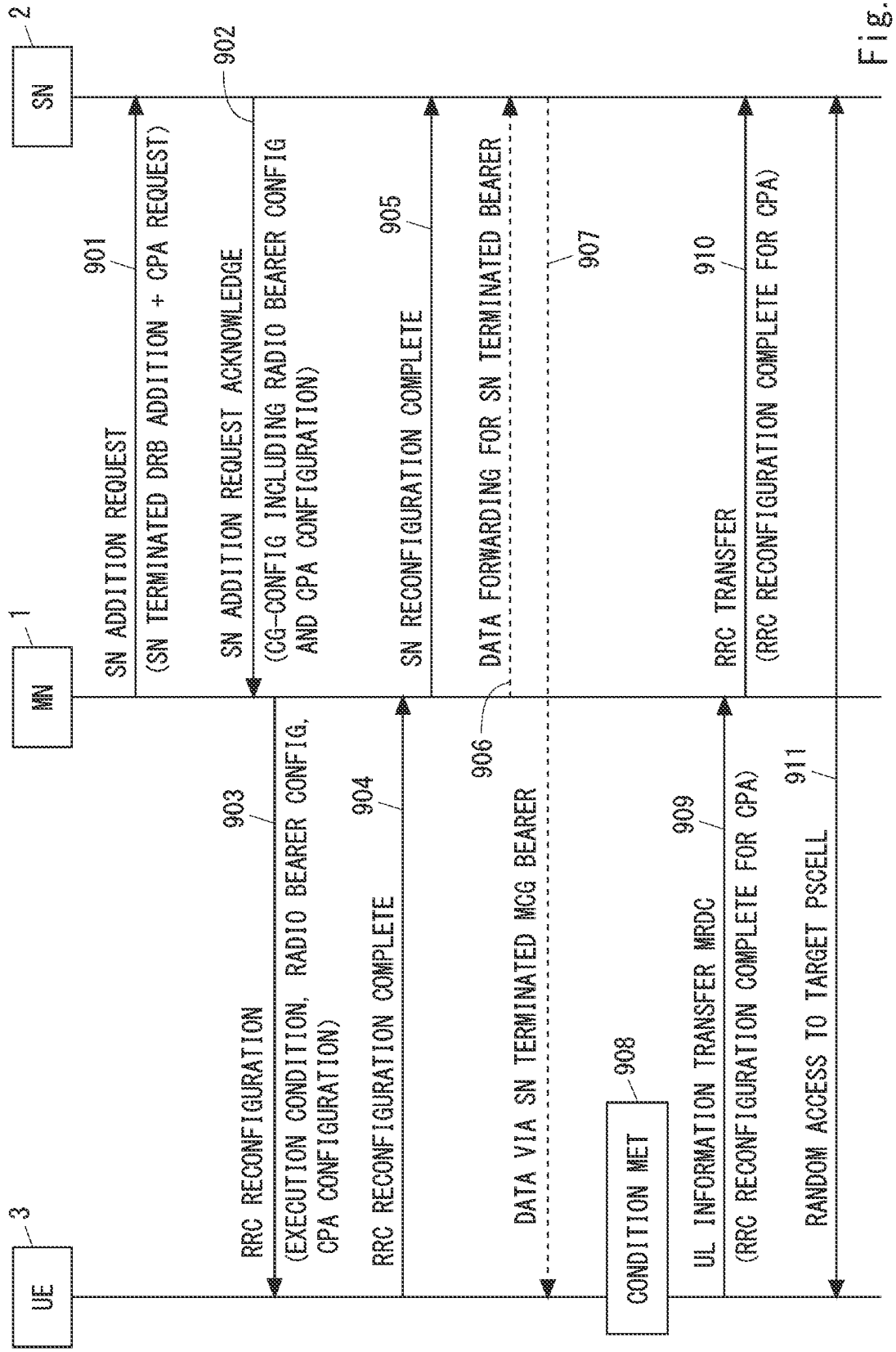
FIG. 9 is a sequence diagram showing an example of signaling according to an embodiment.

FIG. 9 shows an example of signaling for a CPA procedure according to this embodiment. Steps 901 to 905 are similar to Steps 701 to 705 in FIG. 7. In Step 906, downlink data forwarding for an established SN terminated MCG bearer may be performed. The data forwarding may be started after Step 902. In Step 907, the SN 2 may transmit the data forwarded from the MN 1 to the UE 3 via the SN terminated MCG bearer.

Steps 908 to 910 are similar to Steps 802 to 805 in FIG. 8. Specifically, in Step 908, the UE 3 determines (or detects) that the CPA execution condition is satisfied. In Step 909, in response to the satisfaction of the CPA execution condition, the UE 3 sends an MN RRC message containing an SN RRC response message to the MN 1. The MN RRC message may be, for example, a UL Information Transfer MRDC message. The SN RRC response message may be, for example, an SN RRC RECONFIGURATION COMPLETE message. In Step 910, the MN 1 forwards the SN RRC response message received from the UE 3 to the SN 2. In Step 911, in response to the satisfaction of the CPA execution condition, the UE 3 starts random access to the candidate PSCell (target PSCell) that is associated with the SN 2 and for which the CPA execution condition has been met. The order of Steps 909 and 911 is not restricted. Step 911 may be started before Step 909.

Fifth Embodiment

A configuration example of a radio communication network according to this embodiment is the same as those shown in FIGS. 1 and 2. This embodiment provides an improvement in the SN ADDITION REQUEST message sent from the MN 1 to the SN 2. In EN-DC where the MN 1 and SN 2 are connected to each other via an X2 interface, the SN ADDITION REQUEST message is an SGNB ADDITION REQUEST message. On the other hand, in NGEN-DC, NE-DC, and NR-DC where the MN 1 and the SN 2 are connected to each other via an Xn interface, the SN ADDITION REQUEST message is an S-NODE ADDITION REQUEST message.

FIGS. 10A and 10B show a specific example of the format of the SGNB ADDITION REQUEST message. In the example of FIGS. 10A and 10B, the SGNB ADDITION REQUEST message contains a "Conditional SN Addition Information" Information Element (IE) indicating a CPA request. The "Conditional SN Addition Information" IE includes a "CPA trigger" (child) IE (1010). The value of the "CPA trigger" (child) IE (1010) is set to "CPA initiation", "CPA replace", or "CPA initiation with DRB addition". The CPA trigger IE indicating "CPA initiation" means CPA involving an addition of an SN terminated DRB. The CPA trigger IE indicating "CPA replace" means a request to the SN 2 to replace a CPA request that has already (or previously) been made or to update or modify the CPA configuration. The CPA trigger IE indicating "CPA initiation with DRB addition" means a request for CPA involving an immediate addition of an SN terminated MCG DRB as described in the first to fourth embodiments. These requests or notifications related to the CPA may be denoted by a different name, or by a different IE.

In the example of FIGS. 10A and 10B, each "E-RABs To Be Added Item" IE included in the "E-RABs To Be Added List" IE indicates a configuration of an E-UTRAN Radio Access Bearer (E-RAB) associated with the SN terminated MCG DRB to be immediately added. An "EN-DC Resource Configuration" IE (1020) within the "E-RABs To Be Added Item" IE contains a EN-DC resource configuration for the E-RAB and indicates a presence of PDCP in the en-gNB, a presence of a lower layer in the MCG, and a presence of a lower layer in the SCG. Specifically, with respect to the E-RAB associated with the SN terminated MCG DRB, the "EN-DC Resource Configuration" IE (1020) indicates a presence of PDCP in the en-gNB, a presence of a lower layer in the MCG, and an absence of a lower layer in the SCG. A "PDCP present in SN" IE (1030) indicates a configuration of the PDCP located in the en-gNB.

Furthermore, in the example of FIGS. 10A and 10B, the "E-RABs To Be Added List" IE may include an "EN-DC Resource Configuration upon Conditional SN Mobility" IE (1040). If an SN terminated MCG DRB to be established immediately is changed to another bearer type upon CPA execution, this IE (1040) indicates the bearer type to which the SN terminated MCG DRB to be changed. For example, if the immediately configured SN terminated MCG DRB is to be changed to an SN terminated SCG DRB, then the IE (1040) indicates a presence of PDCP in the en-gNB, an absence of a lower layer in the MCG (not present), and a presence of a lower layer in the SCG.

FIGS. 11A and 11B show another specific example of the format of the SGNB ADDITION REQUEST message. In the example of FIGS. 11A and 11B, an "SGNB Addition Trigger Indication" IE (1110) is used to indicate the type of CPA. For example, the "SGNB Addition Trigger Indication" IE (1110) indicating "Conditional SN addition" means CPA involving an addition of an SN terminated DRB upon CPA execution. The "SGNB Addition Trigger Indication" IE (1110) indicating "Conditional PSCell addition" means CPA involving an immediate addition of an SN terminated MCG DRB as described in the first to fourth embodiments.

The IEs 1120, 1130, and 1140 shown in FIG. 11A are similar to the IEs 1020, 1030, and 1040 shown in FIG. 10A.

FIGS. 12A and 12B show a specific example of the format of the S-NODE ADDITION REQUEST message. A "CPA trigger" IE (1210) in a "Conditional SN Addition Information" IE is similar to the "CPA trigger" IE (1010) shown in FIG. 10B. However, the "CPA trigger" IE (1210) of FIG. 12B indicates a setup of a QoS flow (or a setup of resources for a QoS flow) instead of adding a DRB. Specifically, the value of the "CPA trigger" (child) IE (1210) may be set to "CPA initiation", "CPA replace", or "CPA initiation with QoS flow addition". The CPA trigger IE (1210) indicating "CPA initiation" means CPA involving an addition of one or more SN terminated DRBs mapped to one or more QoS flows. The CPA trigger IE indicating "CPA replace" means a request to the SN 2 to replace a CPA request that has already (or previously) been made or to update or modify the CPA configuration. The CPA trigger IE indicating the "CPA initiation with QoS flow addition" means a request for CPA involving an immediate addition of one or more SN terminated MCG DRBs mapped to one or more QoS flows.

In the example of FIGS. 12A and 12B, each "PDU Session Resources To Be Added Item" IE included in the "PDU Session Resources To Be Added List" IE indicates configurations of one or more QoS flows with MCG resource that are to be set up immediately (and tha are to mapped to the SN terminated MCG DRB). A "PDU Session Resource Setup Info-SN terminated" IE (1220) within the "PDU Session Resources To Be Added Item" IE contains information needed to add SN resources for one or more SN terminated DRBs mapped to one or more QoS flows. More specifically, this IE (1220) contains a "Non-GBR Resources Offered" IE. The "Non-GBR Resources Offered" IE indicates that the MCG provides non-GBR resources for non-GBR QOS flows. This allows the SN to know that it may configure an SN terminated MCG bearer(s) for these non-GBR QOS flows. Note that when a plurality of QoS flows are assigned to the SN (in other words, when resources for a plurality of QoS flows need to be set up at the SN), the SN 2 may determine mapping between the Qos flows and one or more SN terminated DRBs.

FIGS. 13A and 13B show another specific example of the format of the S-NODE ADDITION REQUEST message. An "SGNB Addition Trigger Indication" IE (1310) shown in FIG. 13B is similar to the "SGNB Addition Trigger Indication" IE (1110) shown in FIG. 11B. A "PDU Session Resource Setup Info-SN terminated" IE (1320) shown in FIG. 13A is similar to the "PDU Session Resource Setup Info-SN terminated" IE (1220) shown in FIG. 12A.

FIG. 14 shows a specific example of an S-NODE ADDITION REQUEST ACKNOWLEDGE message sent from the SN 2 to the MN 1 in the case of NGEN-DC, NE-DC, and NR-DC. In the example of FIG. 14, the S-NODE ADDITION REQUEST ACKNOWLEDGE message contains a "PDU Session Resource Setup Response Info-SN terminated" IE (1410). This IE (1410) indicates configurations of one or more SN terminated DRBs. The configuration of each SN terminated DRB includes a PDCP configuration and a list of one or more QoS flows mapped to the SN terminated DRB.

FIG. 15 shows a specific example of the format of the "PDU Session Resource Setup Response Info-SN terminated" IE (1410). In the example of FIG. 15, this IE (1410) includes a "UL Configuration" IE (1510). The "UL Configuration" IE (1510) indicates whether or not each SN terminated DRB uses uplink resources of the MN. In other words, the "UL Configuration" IE (1510) indicates how the UE 3 uses the uplink at the corresponding node (i.e., MN1). More specifically, the "UL Configuration" IE (1510) may contain an "UL UE Configuration" IE, which is an enumerated IE indicating "no-data", "shared", or "only". The value "no-data" means that one or more Qos flows mapped to the SN terminated DRB use only SCG resources (i.e., corresponding to an SCG DRB). the value "shared" means that one or more QoS flows mapped to the SN terminated DRB use both MCG and SCG resources (i.e., corresponding to a split DRB). The value "only" means that one or more QoS flows mapped to the SN terminated DRB use only MCG resources (i.e., corresponding to an MCG DRB).

Furthermore, in the example of FIG. 15, the "PDU Session Resource Setup Response Info-SN terminated" IE (1410) may include a "UL Configuration upon Conditional SN Mobility" IE (1520). If an SN terminated MCG DRB to be established immediately is changed to another bearer type upon CPA execution, this IE (1520) indicates the bearer type to which the SN terminated MCG DRB to be changed. For example, if the immediately configured SN terminated MCG DRB is to be changed to an SN terminated SCG DRB, then the IE (1520) indicates that the uplink resources of the MN 1 are not used.

FIG. 16 shows another specific example of the format of the "PDU Session Resource Setup Response Info-SN terminated" IE (1410). In the example of FIG. 16, this IE (1410) includes an "SN UL PDCP UP TNL Information" IE (1610). A "UL Configuration" IE (1630) indicates whether or not each SN terminated DRB uses uplink resources of the MN. In other words, the "UL Configuration" IE (1630) indicates whether each SN terminated DRB is an MCG DRB, a split DRB, or an SCG DRB.

Furthermore, in the example of FIG. 16, the "PDU Session Resource Setup Response Info-SN terminated" IE (1410) may include an "SN UL PDCP UP TNL Information upon Conditional SN Mobility" IE (1620). If an SN terminated MCG DRB to be established immediately is changed to another bearer type upon CPA execution, this IE (1620) indicates the bearer type to which the SN terminated MCG DRB to be changed. For example, if the immediately configured SN terminated MCG DRB is to be changed to an SN terminated SCG DRB, then the IE (1620) indicates that the resources of the MN 1 are not used.

More specifically, the "SN UL PDCP UP TNL Information upon Conditional SN Mobility" IE (1620) indicates User Plane (UP) transport parameters related to a DRB. These parameters include UP transport layer information and a cell group ID. The UP transport layer information is associated with NG or Xn user plane transport and includes, for example, an Internet Protocol (IP) address and a GPRS Tunnelling Protocol (GTP) Tunnel Endpoint Identifier (TEID). The cell group ID indicates MCG or SCG. The "SN UL PDCP UP TNL Information upon Conditional SN Mobility" IE (1620) may include a "UP Transport Layer Information" IE and a "Cell Group ID" IE. For example, if the immediately configured SN Terminated MCG DRB is to be changed to an SN Terminated SCG DRB upon CPA execution, the value of the "Cell Group ID" IE may be set to "1" (which means the SCG) and the "UP Transport Layer Information" IE may be ignored (or considered invalid).

In the example of FIG. 16, the "UL Configuration" IE (1630) indicates how the UE 3 uses the uplink at the corresponding node (i.e., MN1). More specifically, the "UL Configuration" IE (1630) may contain an "UL UE Configuration" IE, which is an enumerated IE indicating "no-data", "shared", or "only". The value "no-data" means that one or more QoS flows mapped to the SN terminated DRB use only SCG resources (i.e., corresponding to an SCG DRB). The value "shared" means that one or more QoS flows mapped to the SN terminated DRB use both MCG and SCG resources (i.e., corresponding to a split DRB). The value "only" means that one or more QoS flows mapped to the SN terminated DRB use only MCG resources (i.e., corresponding to an MCG DRB).

The message formats described with reference to FIGS. 10A to 16 are examples. For example, the names and types of the information elements shown in these drawings may be changed as appropriate.

The SGNB ADDITION REQUEST message, shown in FIGS. 10A and 10B or FIGS. 11A and 11B, may include information about one or more DRBs (e.g., SCG DRB or split DRB) that are to be newly configured upon CPA execution and use SCG radio resources. For example, the SGNB ADDITION REQUEST message shown in FIGS. 10A and 10B or FIGS. 11A and 11B may further include a separate "E-RABs To Be Added List" IE regarding one or more DRBs that are to be newly configured upon CPA execution and use SCG radio resources. This may be defined as a sub (or child) IE of the Conditional SN Addition Information IE. Upon receiving that sub-IE, the SN 2 further generates a radio bearer configuration for the DRB indicated therein and sends it to the MN 1 in an SGNB ADDITION REQUEST ACKNOWLEDGE message (or a CG-Config contained in this message).

Alternatively, the "E-RABs To Be Added List" IE in the SGNB ADDITION REQUEST message shown in FIG. 10A or 11A may further include information (or a flag) indicating whether the addition of each DRB (and E-RAB) to be added is at the time of CPA execution or not. For example, if the SGNB ADDITION REQUEST message includes a CPA request, but does not include this information (or flag) for a DRB to be added, this may mean that this DRB needs to be immediately added.

Similarly, the S-NODE ADDITION REQUEST message, shown in FIGS. 12A and 12B or FIGS. 13A and 13B, may include information about one or more QoS flows (e.g., QoS flow with SCG resources or QoS flow with MCG and SCG resources) that are to be newly set up upon CPA execution and use SCG radio resources. For example, the S-NODE ADDITION REQUEST message shown in FIGS. 12A and 12B or FIGS. 13A and 13B may further include a separate "PDU Session Resources To Be Added List" IE regarding one or more QoS flows that are to be newly set up upon CPA execution and use SCG radio resources. This may be specified as a sub (or child) IE of the Conditional SN Addition Information IE. Upon receiving that sub-IE, the SN 2 further generates a radio bearer configuration for the QoS flow indicated therein and transmits it to the MN 1 in an S-NODE ADDITION REQUEST ACKNOWLEDGE message (or a CG-Config contained in this message).

Alternatively, the "PDU Session Resources To Be Added List" IE in the S-NODE ADDITION REQUEST messages shown in FIG. 12A or 13A may further include information (or a flag) indicating whether the setup of resources (including a DRB) for the QOS flow is at the time of CPA execution or not. For example, if the S-NODE ADDITION REQUEST message includes a CPA request but does not include the information (or flag) for each QoS flow, this may mean that resources (including a DRB) for this QoS flow needs to be set up immediately.

Sixth Embodiment

A configuration example of a radio communication network according to this embodiment is the same as those shown in FIGS. 1 and 2. This embodiment provides an improvement in the MN RRC Reconfiguration message sent from the MN 1 to the UE 3. The MN RRC Reconfiguration message may be an E-UTRA RRC Connection Reconfiguration message in EN-DC and NGEN-DC, or an NR RRC Reconfiguration message in NE-DC and NR-DC.

FIGS. 17A and 17B show an example of the format of the E-UTRA RRC Connection Reconfiguration message. In the example of FIGS. 17A and 17B, the RRC Connection Reconfiguration message includes a "conditionalReconfiguration-v17xy" IE (1710). The "conditionalReconfiguration-v17xy" IE (1710) includes "condReconfigurationToAddModList-v17xy" (1720). The "condReconfigurationToAddModList-v17xy" (1720) includes a "triggerCondition-r16" IE (1730) indicating a CPA execution condition and a "condReconfigurationToApply-v17xy" IE (1740) indicating CPA configuration information. An "nr-RadioBearerConfig1-r15" or "nr-RadioBearerConfig2-r15" IE (1750) indicates information about a DRB to be added upon CPA execution.

FIGS. 18A and 18B show an example of the format of the NR RRC Reconfiguration message. In the example of FIGS. 18A and 18B, the RRC Reconfiguration message includes a "conditionalReconfiguration-v17xy" IE (1810). The "conditionalReconfiguration-v17xy" IE (1810) includes "condReconfigurationToAddModList-v17xy" (1820). The "condReconfigurationToAddModList-v17xy" (1820) includes a "condExecutionCond-v17xy" IE (1830) indicating a CPA execution condition and an "mrdc-SecondaryCellGroupConfig" IE (1840) indicating CPA configuration information. A "radioBearerConfig1" or "nr-radioBearerConfig2" IE (1850) indicates information about a DRB to be added upon CPA execution.

Seventh Embodiment

A configuration example of a radio communication network according to this embodiment is the same as those shown in FIGS. 1 and 2. This embodiment provides a modification in the conditional PSCell addition (CPA) described in the first to sixth embodiments.

If the CPA execution condition for a candidate PSCell is satisfied, the UE 3 applies the CPA configuration for this candidate PSCell and starts a random access procedure to synchronize to this candidate PSCell. As already described in the above embodiments, the CPA configuration (e.g., conditionalReconfiguration IE 1710 or 1810) includes an SCG configuration.

Further, the CPA configuration may include an MCG configuration. Specifically, the MN 1 may include, in the CPA configuration to be sent to the UE 3, a reconfiguration of the MCG configuration to be applied when the CPA execution condition is satisfied. In this case, if the CPA execution condition for the candidate PSCell is satisfied, the UE 3 applies the SCG configuration and performs the CPA while further reconfiguring the corresponding MCG configuration.

For E-UTRA MCG, the MCG configuration included in the CPA configuration may be a Radio Resource Config Dedicated or an RRC Connection Reconfiguration message. On the other hand, for NR MCG, the MCG configuration included in the CPA configuration may be a Cell Group Config or an RRC Reconfiguration message.

If the MCG configuration included in the CPA configuration is an RRC (Connection) Reconfiguration message, the UE 3 may transmit an MN RRC (Connection) Reconfiguration Complete message to the MN 1 in response to the satisfaction of the CPA condition, instead of a UL Information Transfer MRDC message (e.g., Step 803 of FIG. 8 or Step 909 of FIG. 9).

FIG. 19 shows a modification of the format of the E-UTRA RRC Connection Reconfiguration message shown in FIG. 17B. In the example of FIG. 19, a "condReconfigurationToApply-v17xy" IE (1940) includes a "masterConfig-r17" IE (1950) and a "secondaryConfig-r17" IE (1960). The "masterConfig-r17" IE (1950) may be a radioResourceConfigDedicated as shown in FIG. 19, or may alternatively be an RRC Connection Reconfiguration message.

FIG. 20 shows a modification of the format of the NR RRC Reconfiguration message shown in FIG. 18B. In the example of FIG. 20, a "condReconfigurationToAddMod-List-v17xy" includes a "masterCellGroup" IE (2040) and a "mrdc-SecondaryCellGroupConfig" IE (2050). The "masterCellGroup" IE (2040) may be a Cell Group Config as shown in FIG. 20, or may alternatively be an RRC Reconfiguration message.

Eighth Embodiment

This embodiment provides a conditional PSCell addition (CPA) procedure different from that described in the first to seventh embodiments. A configuration example of a radio communication network according to this embodiment may be the same as those shown in FIGS. 1 and 2.

In the CPA procedure according to this embodiment, an SN addition procedure is executed first to set up an SN terminated MCG DRB (which requires no SCG configuration), and then a SN modification procedure which needs an SCG configuration for CPA is executed.

Figure 21:
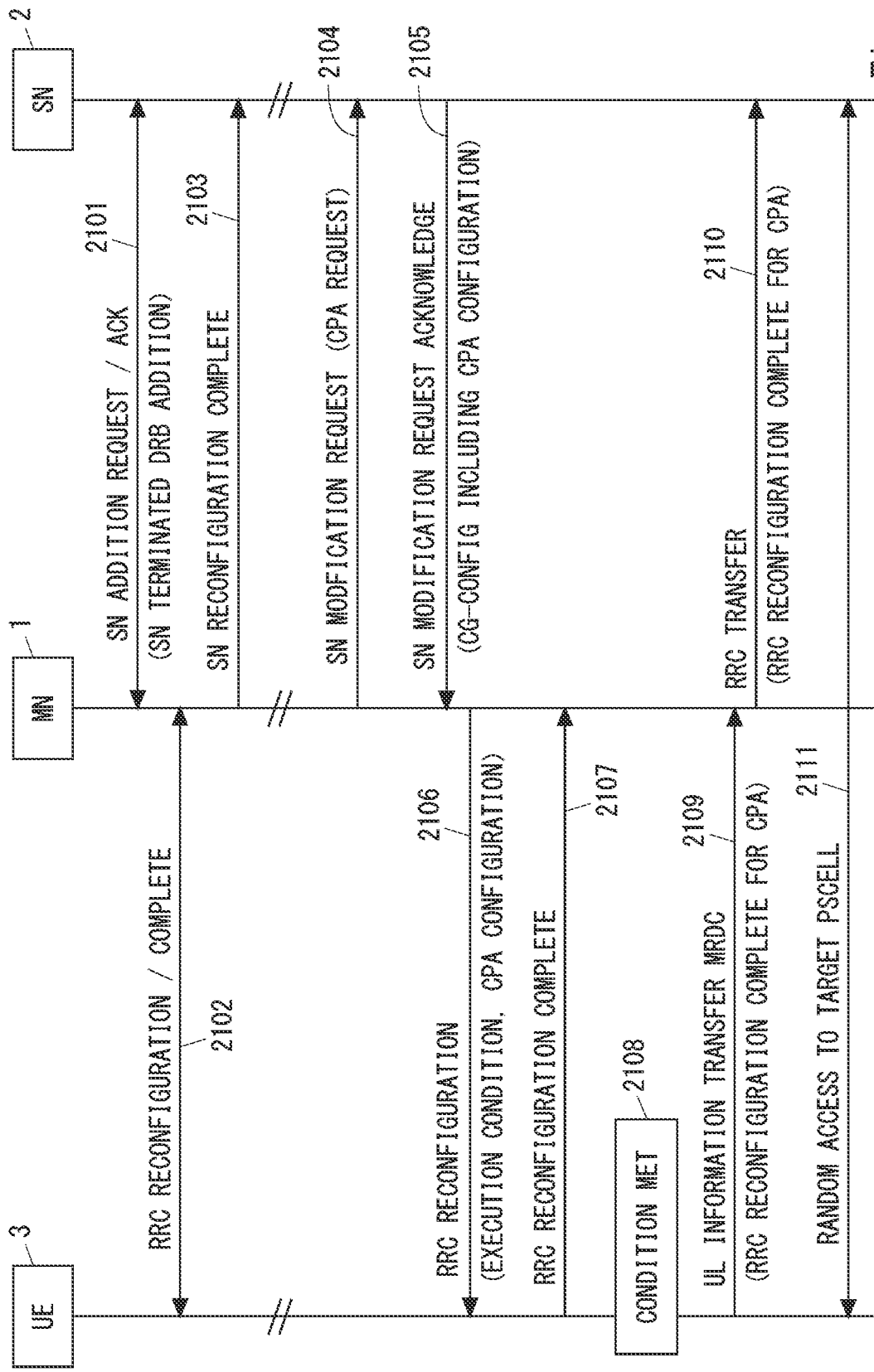
FIG. 21 is a sequence diagram showing an example of signaling according to an embodiment.

FIG. 21 shows an example of signaling according to this embodiment. In Steps 2101 to 2103, an SN addition procedure, which requires no SCG configuration, is executed to set up an SN terminated MCG DRB. Specifically, in Step 2101, the MN 1 sends an SN ADDITION REQUEST message to the SN 2. This SN ADDITION REQUEST message requests the SN 2 to configure an SN terminated MCG DRB. The SN 2 sends an SN ADDITION REQUEST ACKNOWLEDGE message. This SN ADDITION REQUEST ACKNOWLEDGE message contains a radio bearer configuration for the SN terminated MCG DRB. In Step 2102, the MN 1 requests the UE 3 to configure the SN terminated MCG DRB via an MN RRC Reconfiguration message. The UE 3 replies the MN 1 with an MN RRC Reconfiguration Complete message and configures the SN terminated MCG DRB. In Step 2103, the MN 1 sends an SN RECONFIGURATION COMPLETE message to the SN 2.

Steps 2104 to 2107 are related to signaling for CPA preparation. In Step 2104, the MN 1 sends an SN MODIFICATION REQUEST message to SN 2. This SN MODIFICATION REQUEST message indicates a CPA request. The SN MODIFICATION REQUEST message may indicate that the already configured SN terminated MCG DRB will be changed to another bearer type (e.g., SN terminated split DRB or SN terminated SCG DRB) upon MCG execution. The SN MODIFICATION REQUEST message may include information about one or more DRBs (e.g., SCG DRB or split DRB) that will be newly configured when the CPA is executed and use SCG radio resources.

In Step 2105, the SN 2 generates a CPA configuration. This CPA configuration includes a radio configuration of the SCG. The SN 2 sends an SN MODIFICATION REQUEST ACKNOWLEDGE message to the MN 1. This SN MODIFICATION REQUEST ACKNOWLEDGE message contains the CPA configuration. The CPA configuration may be contained in a CG-Config message. The CG-Config message is an inter-node RRC message used to transfer an SCG radio configuration generated by the SN to the MN.

In Step 2106, the MN 1 generates a CPA execution condition for the CPA configuration received from the SN 2. The MN 1 then transmits an MN RRC Reconfiguration message to the UE 3. This MN RRC Reconfiguration message contains the CPA execution condition and the CPA configuration (i.e., SCG configuration associated with the SN2).

In Step 2107, the UE 3 transmits an MN RRC Reconfiguration Complete message to the MN 1 and starts evaluating the CPA execution condition.

In Step 2108, the UE 3 determines (or detects) that the CPA execution condition is met. In Step 2109, in response to the satisfaction of the CPA execution condition, the UE 3 sends an MN RRC message containing an SN RRC response message to the MN 1. The MN RRC message may be, for example, a UL Information Transfer MRDC message. The SN RRC response message may be, for example, an SN RRC RECONFIGURATION COMPLETE message. In Step 2110, the MN 1 forwards the SN RRC response message received from the UE 3 to the SN 2. In Step 2111, in response to the satisfaction of the CPA execution condition, the UE 3 starts random access to the candidate PSCell associated with the SN 2. The order of Steps 2109 and 2111 is not restricted. Step 2111 may be started before Step 2109.

According to this CPA procedure, the SN terminated MCG DRB is first added and then the CPA is executed when the execution condition is satisfied. In other words, in this CPA procedure, the SN terminated MCG DRB is established prior to the execution of the CPA. This CPA procedure can provide, for example, the following advantages. In some implementations, if the CPA execution fails and a (SN terminated) SCG DRB or (SN terminated) split DRB that would have been configured in the CPA is not available, the UE 3 can still continue to use the SN terminated MCG DRB. This can contribute to mitigating communication continuity problems caused by a CPA failure.

The CPA procedure described in this embodiment may be modified as follows. For example, as described in the third embodiment, the UE 3 may fall back to the SCG terminated MCG DRB that has been established before the CPA execution, in response to detection of a CPA execution failure. For example, if the UE 3 fails in random access to the candidate PSCell in Step 2111, the UE 3 may fall back to the SCG terminated MCG DRB that has been established before the CPA execution. Similarly, the MN 1 may fall back to the SCG terminated MCG DRB that has been established before the CPA execution. Specifically, if the CPA execution fails, then the UE 3 and the MN 1 may continue data communication through the SN terminated MCG DRB established before the CPA execution. If the failed CPA involved a bearer type change of the SN terminated MCG DRB, the UE 3 and the MN 1 may change the SN terminated split DRB or SN terminated SCG DRB back to the SN terminated MCG DRB. More specifically, if the failed CPA involved a change from the SN terminated MCG DRB to an SN terminated split DRB, the UE 3 and the MN 1 may continue data reception via the MCG part of the split bearer. Alternatively, the UE 3 may autonomously perform a bearer type change from the SN terminated split DRB to the SN terminated MCG DRB, without an explicit RRC Reconfiguration. If the failed CPA involved a change from the SN terminated MCG DRB to an SN terminated SCG DRB, the MN 1 may reconfigure the MCG resources to the UE 3.

Figure 22:
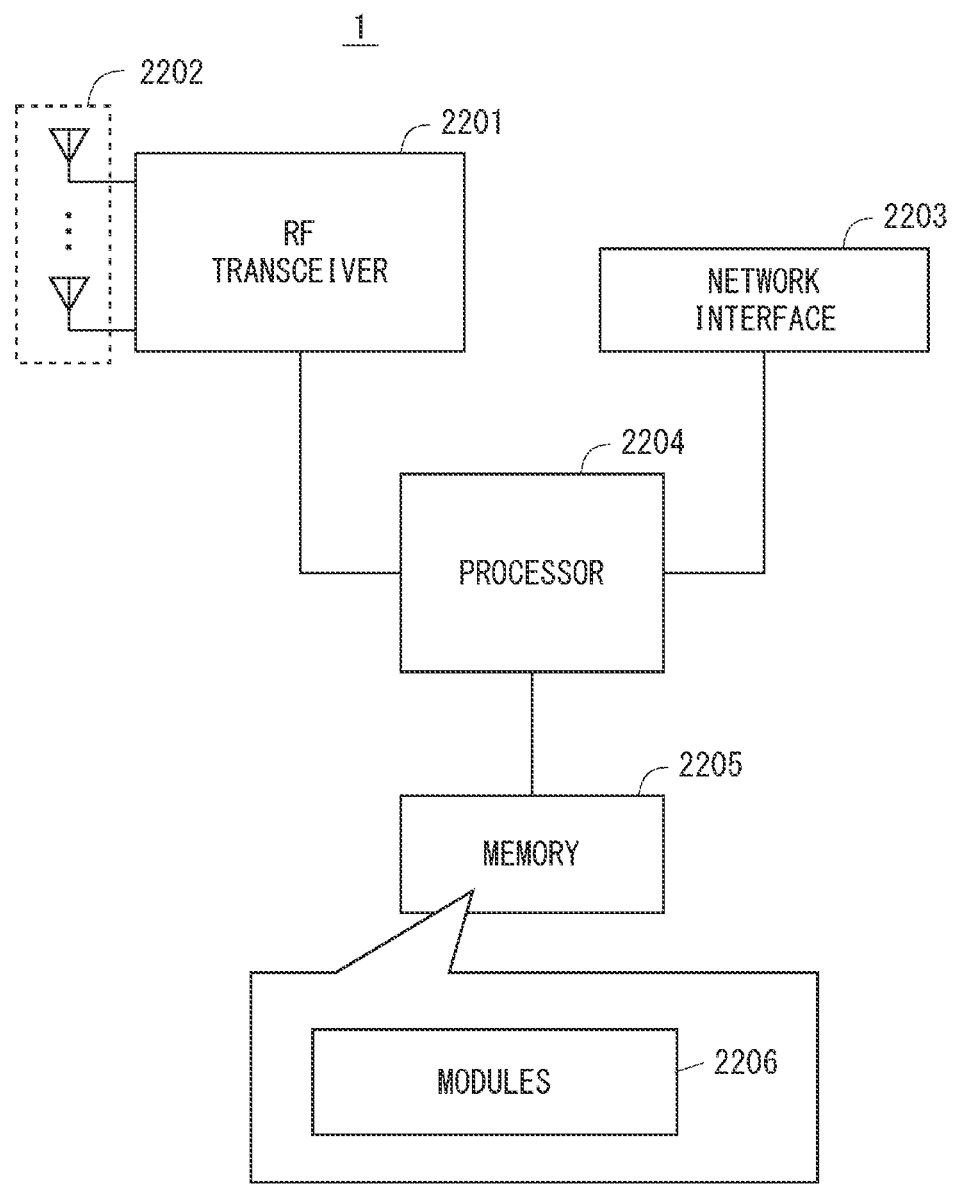
FIG. 22 is a block diagram showing a configuration example of a master node according to an embodiment.

The following provides configuration examples of the MN 1, the SN 2, and the UE 3 according to the embodiments. FIG. 22 is a block diagram showing a configuration example of the MN 1 according to the above-described embodiments. The configuration of the SN 2 may be the same as that shown in FIG. 22. Referring to FIG. 22, the MN 1 includes a Radio Frequency transceiver 2201, a network interface 2203, a processor 2204, and a memory 2205. The RF transceiver 2201 performs analog RF signal processing to communicate with UEs including the UE 3. The RF transceiver 2201 may include a plurality of transceivers. The RF transceiver 2201 is coupled to an antenna array 2202 and the processor 2204. The RF transceiver 2201 receives modulation symbol data from the processor 2204, generates a transmission RF signal, and supplies the transmission RF signal to the antenna array 2202. The RF transceiver 2201 generates a baseband reception signal based on a reception RF signal received by the antenna array 2202 and supplies the baseband reception signal to the processor 2204. The RF transceiver 2201 may include an analog beamformer circuit for beamforming. The analog beamformer circuit includes, for example, a plurality of phase shifters and a plurality of power amplifiers.

The network interface 2203 is used to communicate with network nodes (e.g., MN 1, and control node and transfer node of a core network). The network interface 2203 may include, for example, a Network Interface Card (NIC) that is compliant with IEEE 802.3 series.

The processor 2204 performs digital baseband signal processing (data plane processing) and control plane processing for radio communication. The processor 2204 may include a plurality of processors. For example, the processor 2204 may include a modem processor (e.g., Digital Signal Processor (DSP)) for performing the digital baseband signal processing and a protocol stack processor (e.g., Central Processing Unit (CPU) or Micro Processing Unit (MPU)) for performing the control plane processing. The processor 2204 may include a digital beamformer module for beamforming. The digital beamformer module may include a Multiple Input Multiple Output (MIMO) encoder and precoder.

The memory 2205 is composed of a combination of a volatile memory and a non-volatile memory. The volatile memory is, for example, a Static Random Access Memory (SRAM), a Dynamic RAM (DRAM), or a combination thereof. The non-volatile memory may be a Mask Read Only Memory (MROM), an Electrically Erasable Programmable ROM (EEPROM), a flash memory, or a hard disk drive, or any combination thereof. The memory 2205 may include a storage disposed separately from the processor 2204. In this case, the processor 2204 may access the memory 2205 via the network interface 2203 or an I/O interface not shown.

The memory 2205 may store one or more software modules (computer programs) 2206 including instructions and data for performing processing by the MN 1 described in the above embodiments. In some implementations, the processor 2204 may be configured to load and execute the software module(s) 2206 from the memory 2205, thereby performing the processing of the MN 1 described in the above embodiments.

When the MN 1 is a CU (e.g., eNB-CU or gNB-CU) or a CU-CP, the MN 1 does not have to the RF transceiver 2201 (and the antenna array 2202).

Figure 23:
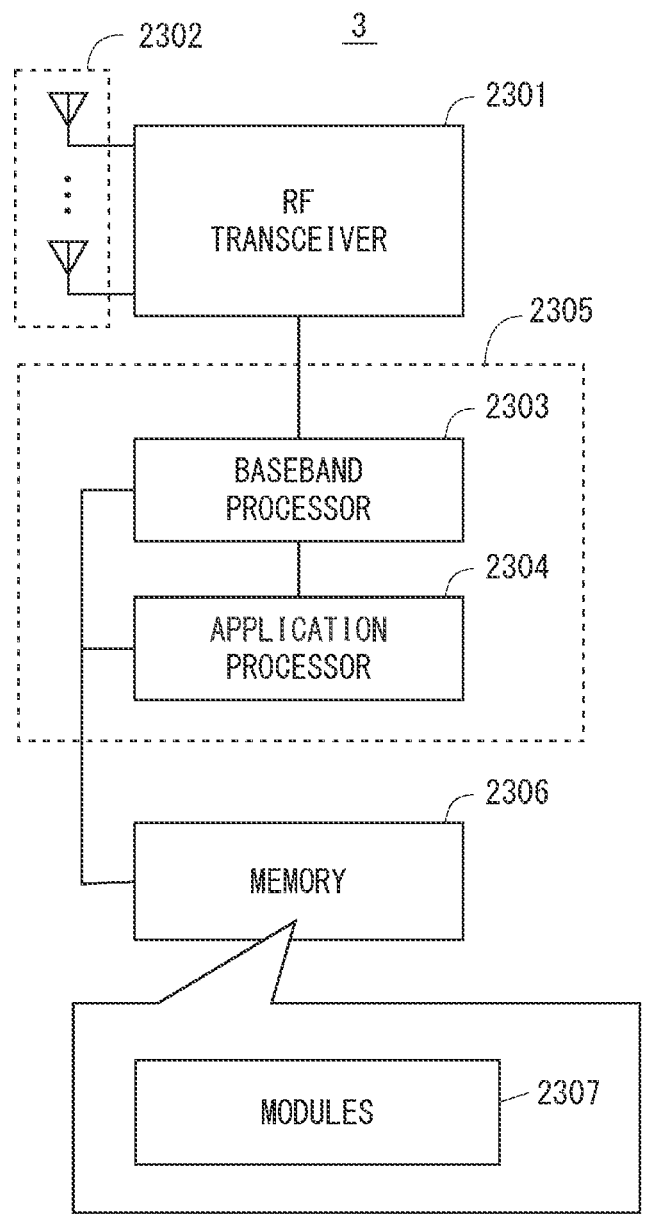
FIG. 23 is a block diagram showing a configuration example of a UE according to an embodiment.

FIG. 23 is a block diagram showing a configuration example of the UE 3. The radio frequency (RF) transceiver 2301 performs analog RF signal processing to communicate with the MN 1 and the SN 2. The RF transceiver 2301 may include a plurality of transceivers. The analog RF signal processing performed by the RF transceiver 2301 includes frequency upconversion, frequency downconversion, and amplification. The RF transceiver 2301 is coupled to the antenna array 2302 and the baseband processor 2303. The RF transceiver 2301 receives modulation symbol data (or OFDM symbol data) from the baseband processor 2303, generates a transmission RF signal, and supplies the transmission RF signal to the antenna array 2302. The RF transceiver 2301 generates a baseband reception signal based on the reception RF signal received by the antenna array 2302 and supplies the baseband reception signal to the baseband processor 2303. The RF transceiver 2301 may include an analog beamformer circuit for beamforming. The analog beamformer circuit includes, for example, a plurality of phase shifters and a plurality of power amplifiers. The baseband processor 2303 performs digital baseband signal processing (data plane processing) and control plane processing for wireless communication. The digital baseband signal processing includes (a) data compression/decompression, (b) data segmentation/concatenation, (c) transmission format (transmission frame) composition/decomposition, (d) channel encoding/decoding, (e) modulation (i.e., symbol mapping)/demodulation, and (f) Inverse Fast Fourier Transform (IFFT) generation of OFDM symbol data (baseband OFDM signal). On the other hand, the control plane processing includes communication management of the layer 1 (e.g., transmission power control), the layer 2 (e.g., radio resource management, and hybrid automatic repeat request (HARQ) processing), and the layer 3 (e.g., signaling regarding attachment, mobility, and call management).

For example, the digital baseband signal processing by the baseband processor 2303 may include signal processing in the Service Data Adaptation Protocol (SDAP) layer, the Packet Data Convergence Protocol (PDCP) layer, Radio Link Control (RLC) layer, MAC layer, and PHY layer. The control plane processing performed by the baseband processor 2303 may also include processing of Non-Access Stratum (NAS) protocol, RRC protocol, and MAC CE.

The baseband processor 2303 may perform MIMO encoding and precoding for beamforming.

The baseband processor 2303 may include a modem processor (e.g., DSP) which performs the digital baseband signal processing and a protocol stack processor (e.g., CPU or MPU) which performs the control plane processing. In this case, the protocol stack processor which performs the control plane processing may be integrated with an application processor 2304 described later.

The application processor 2304 may also be referred to as a CPU, an MPU, a microprocessor, or a processor core. The application processor 2304 may include a plurality of processors (processor cores). The application processor 2304 loads a system software program (Operating System (OS)) and various application programs (e.g., a voice call application, a WEB browser, a mailer, a camera operation application, music reproduction application) from a memory 2306 or from another memory (not shown) and executes these programs, thereby providing various functions of the UE 3.

In some implementations, as represented by the dashed line (2305) in FIG. 23, the baseband processor 2303 and the application processor 2304 may be integrated on a single chip. In other words, the baseband processor 2303 and the application processor 2304 may be implemented in a single System on Chip (SoC) device 2305. A SoC device may be referred to as a system Large Scale Integration (LSI) or a chipset.

The memory 2306 is a volatile memory or a non-volatile memory or a combination thereof. The memory 2306 may include a plurality of physically independent memory devices. The volatile memory is, for example, SRAM, DRAM, or a combination thereof. The non-volatile memory may be MROM, an EEPROM, a flash memory, a hard disk drive, or any combination thereof. The memory 2306 may include, for example, an external memory device that can be accessed from the baseband processor 2303, the application processor 2304, or the SoC 2305. The memory 2306 may include an internal memory device integrated within the baseband processor 2303, the application processor 2304, or the SoC 2305. Further, the memory 2306 may include a memory in a Universal Integrated Circuit Card (UICC).

The memory 2306 may store one or more software modules (computer programs) 2307 including instructions and data for processing by the UE 3 described in the above embodiments. In some implementations, the baseband processor 2303 or the application processor 2304 may load the software module(s) 2307 from the memory 2306 and execute the loaded software module(s) 2307, thereby performing the processing of the UE 3 described in the above embodiments with reference to the drawings.

Note that the control plane processing and operation performed by the UE 3 described in the above embodiments can be implemented by other elements except the RF transceiver 2301 and the antenna array 2302, i.e., at least one of the baseband processor 2303 and the application processor 2304 and the memory 2306 storing the software module(s) 2307.

As described with reference to FIGS. 22 and 23, each of the processors included in the MN 1, the SN 2, and the UE 3 according to the above-described embodiments executes one or more programs including instructions for causing a computer to execute the algorithm described with reference to the drawings. This programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, semiconductor memories (such as Mask ROM, Programmable ROM (PROM), Erasable PROM (EPROM), flash ROM, Random Access Memory (RAM)). These programs may be provided to a computer using any type of transitory computer readable media. Examples of transitory computer readable media include electric signals, optical signals, and electromagnetic waves. Transitory computer readable media can be used to provide programs to a computer via a wired communication line (e.g., electric wires and optical fibers) or a wireless communication line.

Other Embodiments

In the embodiments described above, the SN 2 may decide whether or not to add only the SN terminated DRB before the CPA execution. For example, when the SN 2 receives a CPA request from the MN 1 involving the addition of one or more SN terminated DRBs, the SN 2 may decide whether or not to immediately add the SN terminated DRB(s). The SN 2 may transmit, to the MN 1, information about the DRB that is determined to be immediately added or information about the DRB determined to be added upon CPA execution, or information indicating both of them.

In the embodiments described above, the MN 1 and the SN 2 may notify each other, by an X2 (or Xn) Setup Request message and an X2 (or Xn) Setup Response message, about whether or not the MN 1 and the SN 2 support the functions required for the CPA.

The CPA may be referred to as a Conditional SN Add (CSA) or Conditional SN Mobility (CSM).

In the embodiments described above, the SN 2 may include the CU 21 and one or more DUs 22 as shown in FIG. 2. The CU 21 receives the SN ADDITION REQUEST message (or the SN MODIFICATION REQUEST message) including the CPA request from the MN 1, and transfers some or all pieces of the information contained in the message to the DU 22 in a UE CONTEXT SETUP REQUEST message. At this time, the CU 21 may add information indicating the CPA to the UE CONTEXT SETUP REQUEST message. For example, the information may be a Conditional SN Mobility Information IE including a sub-IE "CPA Trigger". The CPA Trigger may be an enumerated IE and may indicate "CPA-initiation" or "CPA-replace". The "CPA-initiation" means that the purpose of setting up the UE context is to prepare for CPA. "CPA-replace" means replacement, update, or modification of the CPA configuration being prepared. The CPA Trigger may also indicate "CPA-initiation with DRB addition". The "CPA-initiation with DRB addition" means CPA with an immediate addition of an SN terminated (MCG) DRB. In other words, the "CPA-initiation with DRB addition" means that the purpose of setting up a UE context is to prepare for the CPA with the immediate addition of an SN terminated (MCG) DRB. Thus, the DU 22 can recognize that the UE Context Setup (configuration such as e.g., Cell Group Configuration) request from the CU 21 is for the CPA. That is, the DU 22 can properly prepare for the CPA.

The SCG configuration described in the above embodiments may be generated by one or both of the CU-CP and DU of the SN 2. The radio bearer configuration regarding the SN terminated DRBs described in the above embodiments may be generated by the CU-CP of the SN 2. The generation of the SN ADDITION REQUEST ACKNOWLEDGE message described in the above embodiments and transmission of the SN ADDITION REQUEST ACKNOWLEDGE message to the MN 1 may be performed by the CU-CP of the SN 2.

The above-described embodiments are merely examples of applications of the technical ideas obtained by the inventors. These technical ideas are not limited to the above-described embodiments and various modifications can be made thereto.

For example, the whole or part of the exemplary embodiments disclosed above can be described as, but not limited to, the following supplementary notes.

(Supplementary Note 1)

A first Radio Access Network (RAN) node configured to operate as a master node associated with a Master Cell Group (MCG) in dual connectivity for a User Equipment (UE), the first RAN node comprising:

at least one memory; and at least one processor coupled to the at least one memory and configured to:

request a conditional Primary Secondary Cell (PSCell) addition, via an SN ADDITION REQUEST message, to a candidate secondary node; and request the candidate secondary node, via the SN ADDITION REQUEST message, to configure an SN terminated MCG bearer, the SN terminated MCG bearer being a radio bearer terminated at the candidate secondary node and using radio resources of the MCG but not using radio resources of a Secondary Cell Group (SCG) associated with the candidate secondary node.

(Supplementary Note 2)

The first RAN node according to Supplementary Note 1, wherein the at least one processor is configured to:

receive an SN ADDITION REQUEST ACKNOWLEDGE message from the candidate secondary node after sending the SN ADDITION REQUEST message, wherein the SN ADDITION REQUEST ACKNOWLEDGE message contains a radio bearer configuration regarding the SN terminated MCG bearer and an SCG configuration of the SCG including a candidate PSCell for the conditional PSCell addition; and transmit an MN Radio Resource Control (RRC) Reconfiguration message to the UE in response to receiving the SN ADDITION REQUEST ACKNOWLEDGE message, wherein the MN RRC Reconfiguration message contains an execution condition for the conditional PSCell addition, the radio bearer configuration, and the SCG configuration.

(Supplementary Note 3)

The first RAN node according to Supplementary Note 2, wherein the at least one processor is configured to:

receive an MN RRC Reconfiguration Complete message from the UE after transmitting the MN RRC Reconfiguration message; and send an SN RECONFIGURATION COMPLETE message to the candidate secondary node in response to receiving the MN RRC Reconfiguration Complete message, to implicitly inform that the UE has successfully established the SN terminated MCG bearer.

(Supplementary Note 4)

The first RAN node according to Supplementary Note 3, wherein the at least one processor is configured to:

after receiving the MN RRC Reconfiguration Complete message, receive a UL Information Transfer MRDC message that is transmitted from the UE in response satisfaction of the execution condition, the UL Information Transfer MRDC message containing an SN RRC response message; and forward the SN RRC response message to the candidate secondary node.

(Supplementary Note 5)

The first RAN node according to any one of Supplementary Notes 1 to 4, wherein the at least one processor is configured to request the candidate secondary node via the SN ADDITION REQUEST message to change, upon execution of the conditional PSCell addition, the SN terminated MCG bearer to an SN terminated split bearer or an SN terminated SCG bearer.

(Supplementary Note 6)

The first RAN node according to Supplementary Note 1, wherein the at least one processor is configured to transmit an MN Radio Resource Control (RRC) Reconfiguration message to the UE, wherein the MN RRC Reconfiguration message includes an execution condition for the conditional Primary Secondary Cell (PSCell) addition, a radio bearer configuration of the SN terminated MCG bearer, an SCG configuration of the SCG including a candidate PSCell for the conditional PSCell addition, and a radio bearer configuration of an SN terminated bearer to be added when the execution condition is satisfied.

(Supplementary Note 7)

The first RAN node according to Supplementary Note 6, wherein the at least one processor is configured to maintain the SN terminated MCG bearer when a failure of the conditional PSCell addition occurs.

(Supplementary Note 8)

The first RAN node according to Supplementary Note 7, wherein the at least one processor is configured to change the SN terminated split bearer or the SN terminated SCG bearer back to the SN terminated MCG bearer when the failure of the conditional PSCell addition occurs.

(Supplementary Note 9)

A second Radio Access Network (RAN) node configured to operate as a secondary node associated with a Secondary Cell Group (SCG) in dual connectivity for a User Equipment (UE), the second RAN node comprising:

at least one memory; and at least one processor coupled to the at least one memory and configured to:

receive an SN ADDITION REQUEST message from a master node, the SN ADDITION REQUEST message including a request for a conditional Primary Secondary Cell (PSCell) addition and a request for an SCG terminated bearer that is a radio bearer terminated at the second RAN node; and send an SN ADDITION REQUEST ACKNOWLEDGE message to the master node in response to the SN ADDITION REQUEST message, wherein the SN ADDITION REQUEST ACKNOWLEDGE message contains an SCG configuration of the SCG including a candidate PSCell for the conditional PSCell addition and a radio bearer configuration regarding an SN terminated MCG bearer that is a radio bearer terminated at the second RAN node and using radio resources of an MCG associated with the master node but not using radio resources of the SCG.

(Supplementary Note 10)

The second RAN node according to Supplementary Note 9, wherein the at least one processor is configured to, upon receiving the SN ADDITION REQUEST message, provide Packet Data Convergence Protocol (PDCP) processing for the SN terminated MCG bearer and prepare the conditional PSCell addition.

(Supplementary Note 11)

The second RAN node according to Supplementary Note 9 or 10, wherein the at least one processor is configured to recognize that the UE has successfully established the SN terminated MCG bearer, upon reception of an SN RECONFIGURATION COMPLETE message from the master node after transmission of the SN ADDITION REQUEST ACKNOWLEDGE message.

(Supplementary Note 12)

The second RAN node according to Supplementary Note 11, wherein the at least one processor is configured to, after receiving the SN RECONFIGURATION COMPLETE message, receive via the master node an SN RRC response message transmitted from the UE in response to satisfaction of an execution condition for the conditional PSCell addition.

(Supplementary Note 13)

The second RAN node according to any one of Supplementary Notes 9 to 12, wherein the SN ADDITION REQUEST ACKNOWLEDGE message indicates that the SN terminated MCG bearer is to be changed to an SN terminated split bearer or an SN terminated SCG bearer upon execution of the conditional PSCell addition.

(Supplementary Note 14)

A User Equipment (UE) comprising:

at least one memory; and at least one processor coupled to the at least one memory and configured to:

receive an MN Radio Resource Control (RRC) Reconfiguration message from a serving Radio Access Network (RAN) node, wherein the MN RRC Reconfiguration message contains an execution condition for a conditional Primary Secondary Cell (PSCell) addition, a radio bearer configuration of an SN terminated MCG bearer, and a Secondary Cell Group (SCG) configuration of an SCG including a candidate PSCell for the conditional PSCell addition; and establish the SN terminated MCG bearer and start evaluating the execution condition in response to receiving the MN RRC Reconfiguration message.

(Supplementary Note 15)

The UE according to Supplementary Note 14, wherein the at least one processor is configured to transmit an MN RRC Reconfiguration Complete message to the serving RAN node in response to establishment of the SN terminated MCG bearer.

(Supplementary Note 16)

The UE according to Supplementary Note 15, wherein the at least one processor is configured to, in response to satisfaction of the execution condition after transmitting the MN RRC Reconfiguration Complete message, transmit a UL Information Transfer MRDC message containing an SN RRC response message to the serving RAN node and start random access to the candidate PSCell.

(Supplementary Note 17)

The UE according to any one of Supplementary Notes 14 to 16, wherein the MN RRC Reconfiguration message indicates that the SN terminated MCG bearer is to be changed to an SN terminated split bearer or an SN terminated SCG bearer upon execution of the conditional PSCell addition.

(Supplementary Note 18)

The UE according to Supplementary Note 17, wherein the at least one processor is configured to maintain the SN terminated MCG bearer when a failure of the conditional PSCell addition occurs.

(Supplementary Note 19)

The UE according to Supplementary Note 18, wherein the at least one processor is configured to change the SN terminated split bearer or the SN terminated SCG bearer back to the SN terminated MCG bearer when the failure of the conditional PSCell addition occurs.

(Supplementary Note 20)

A method performed by a first Radio Access Network (RAN) node configured to operate as a master node associated with a Master Cell Group (MCG) in dual connectivity for a User Equipment (UE), the method comprising:

requesting a conditional Primary Secondary Cell (PSCell) addition, via an SN ADDITION REQUEST message, to a candidate secondary node; and requesting the candidate secondary node, via the SN ADDITION REQUEST message, to configure an SN terminated MCG bearer, the SN terminated MCG bearer being a radio bearer terminated at the candidate secondary node and using radio resources of the MCG but not using radio resources of a Secondary Cell Group (SCG) associated with the candidate secondary node.

(Supplementary Note 21)

A method performed by a second Radio Access Network (RAN) node configured to operate as a secondary node associated with a Secondary Cell Group (SCG) in dual connectivity for a User Equipment (UE), the method comprising:

receiving an SN ADDITION REQUEST message from a master node, the SN ADDITION REQUEST message including a request for a conditional Primary Secondary Cell (PSCell) addition and a request for an SCG terminated bearer that is a radio bearer terminated at the second RAN node; and sending an SN ADDITION REQUEST ACKNOWLEDGE message to the master node in response to the SN ADDITION REQUEST message, wherein the SN ADDITION REQUEST ACKNOWLEDGE message contains an SCG configuration of the SCG including a candidate PSCell for the conditional PSCell addition and a radio bearer configuration regarding an SN terminated MCG bearer that is a radio bearer terminated at the second RAN node and using radio resources of an MCG associated with the master node but not using radio resources of the SCG.

(Supplementary Note 22)

A method performed by a User Equipment (UE), the method comprising:

receiving an MN Radio Resource Control (RRC) Reconfiguration message from a serving Radio Access Network (RAN) node, wherein the MN RRC Reconfiguration message contains an execution condition for a conditional Primary Secondary Cell (PSCell) addition, a radio bearer configuration of an SN terminated MCG bearer, and a Secondary Cell Group (SCG) configuration of an SCG including a candidate PSCell for the conditional PSCell addition; and establishing the SN terminated MCG bearer and starting to evaluate the execution condition in response to receiving the MN RRC Reconfiguration message.

(Supplementary Note 23)

A program for causing a computer to perform a method of a first Radio Access Network (RAN) node configured to operate as a master node associated with a Master Cell Group (MCG) in dual connectivity for a User Equipment (UE), the method comprising:

requesting a conditional Primary Secondary Cell (PSCell) addition, via an SN ADDITION REQUEST message, to a candidate secondary node; and requesting the candidate secondary node, via the SN ADDITION REQUEST message, to configure an SN terminated MCG bearer, the SN terminated MCG bearer being a radio bearer terminated at the candidate secondary node and using radio resources of the MCG but not using radio resources of a Secondary Cell Group (SCG) associated with the candidate secondary node.

(Supplementary Note 24)

A program for causing a computer to perform a method of a second Radio Access Network (RAN) node configured to operate as a secondary node associated with a Secondary Cell Group (SCG) in dual connectivity for a User Equipment (UE), the method comprising:

receiving an SN ADDITION REQUEST message from a master node, the SN ADDITION REQUEST message including a request for a conditional Primary Secondary Cell (PSCell) addition and a request for an SCG terminated bearer that is a radio bearer terminated at the second RAN node; and sending an SN ADDITION REQUEST ACKNOWLEDGE message to the master node in response to the SN ADDITION REQUEST message, wherein the SN ADDITION REQUEST ACKNOWLEDGE message contains an SCG configuration of the SCG including a candidate PSCell for the conditional PSCell addition and a radio bearer configuration regarding an SN terminated MCG bearer that is a radio bearer terminated at the second RAN node and using radio resources of an MCG associated with the master node but not using radio resources of the SCG.

(Supplementary Note 25)

A program for causing a computer to perform a method of a User Equipment (UE), the method comprising:
receiving an MN Radio Resource Control (RRC) Reconfiguration message from a serving Radio Access Network (RAN) node, wherein the MN RRC Reconfiguration message contains an execution condition for a conditional Primary Secondary Cell (PSCell) addition, a radio bearer configuration of an SN terminated MCG bearer, and a Secondary Cell Group (SCG) configuration of an SCG including a candidate PSCell for the conditional PSCell addition; and
establishing the SN terminated MCG bearer and starting to evaluate the execution condition in response to receiving the MN RRC Reconfiguration message.

This application is based upon and claims the benefit of priority from Japanese patent application No. 2020-133305, filed on Aug. 5, 2020, the disclosure of which is incorporated herein in its entirety by reference.

REFERENCE SIGNS LIST

1 MASTER NODE (MN)
2 SECONDARY NODE (SN)
3 USER EQUIPMENT (UE)
2204 PROCESSOR
2205 MEMORY
2206 MODULES
2303 BASEBAND PROCESSOR
2304 APPLICATION PROCESSOR
2306 MEMORY
2307 MODULES

What is claimed is:

1. A first Radio Access Network (RAN) node configured to operate as a master node associated with a Master Cell Group (MCG) in dual connectivity for a User Equipment (UE), the first RAN node comprising:
at least one memory; and
at least one processor coupled to the at least one memory and configured to:
request a conditional Primary Secondary Cell (PSCell) addition, via an SN ADDITION REQUEST message, to a candidate secondary node; and
request the candidate secondary node, via the SN ADDITION REQUEST message, to configure an SN terminated MCG bearer, the SN terminated MCG bearer being a radio bearer terminated at the candidate secondary node and using radio resources of the MCG but not using radio resources of a Secondary Cell Group (SCG) associated with the candidate secondary node,
wherein the conditional PSCell addition requested by the SN ADDITION REQUEST message involves a bearer type change of the SN terminated MCG bearer to an SN terminated split bearer or an SN terminated SCG bearer.

2. The first RAN node according to claim 1, wherein the at least one processor is configured to:
receive an SN ADDITION REQUEST ACKNOWLEDGE message from the candidate secondary node after sending the SN ADDITION REQUEST message, wherein the SN ADDITION REQUEST ACKNOWLEDGE message contains a radio bearer configuration regarding the SN terminated MCG bearer and an SCG configuration of the SCG including a candidate PSCell for the conditional PSCell addition; and
transmit an MN Radio Resource Control (RRC) Reconfiguration message to the UE in response to receiving the SN ADDITION REQUEST ACKNOWLEDGE message, wherein the MN RRC Reconfiguration message contains an execution condition for the conditional PSCell addition, the radio bearer configuration, and the SCG configuration.

3. The first RAN node according to claim 2, wherein the at least one processor is configured to:
receive an MN RRC Reconfiguration Complete message from the UE after transmitting the MN RRC Reconfiguration message; and
send an SN RECONFIGURATION COMPLETE message to the candidate secondary node in response to receiving the MN RRC Reconfiguration Complete message, to implicitly inform that the UE has successfully established the SN terminated MCG bearer.

4. The first RAN node according to claim 3, wherein the at least one processor is configured to:
after receiving the MN RRC Reconfiguration Complete message, receive a UL Information Transfer MRDC message that is transmitted from the UE in response satisfaction of the execution condition, the UL Information Transfer MRDC message containing an SN RRC response message; and
forward the SN RRC response message to the candidate secondary node.

5. The first RAN node claim 1, wherein the SN ADDITION REQUEST message indicates that the SN terminated MCG bearer is to be changed to the SN terminated split bearer or the SN terminated SCG bearer upon execution of the conditional PSCell addition.

6. The first RAN node according to claim 1, wherein the at least one processor is configured to transmit an MN Radio Resource Control (RRC) Reconfiguration message to the UE,
wherein the MN RRC Reconfiguration message includes an execution condition for the conditional Primary Secondary Cell (PSCell) addition, a radio bearer configuration of the SN terminated MCG bearer, an SCG configuration of the SCG including a candidate PSCell for the conditional PSCell addition, and a radio bearer configuration of an SN terminated bearer to be added when the execution condition is satisfied.

7. The first RAN node according to claim 1, wherein the at least one processor is configured to maintain the SN terminated MCG bearer when a failure of the conditional PSCell addition occurs.

8. The first RAN node according to claim 7, wherein the at least one processor is configured to change the SN terminated split bearer or the SN terminated SCG bearer back to the SN terminated MCG bearer when the failure of the conditional PSCell addition occurs.

9. A User Equipment (UE) comprising:
at least one memory; and
at least one processor coupled to the at least one memory and configured to:
receive an MN Radio Resource Control (RRC) Reconfiguration message from a serving Radio Access Network (RAN) node, wherein the MN RRC Reconfiguration message contains an execution condition for a conditional Primary Secondary Cell (PSCell) addition, a radio bearer configuration of an SN terminated MCG bearer, and a Secondary Cell Group (SCG) configuration of an SCG including a candidate PSCell for the conditional PSCell addition; and establish the SN terminated MCG bearer and start evaluating the execution condition in response to receiving the MN RRC Reconfiguration message.

10. The UE according to claim 9, wherein the at least one processor is configured to transmit an MN RRC Reconfiguration Complete message to the serving RAN node in response to establishment of the SN terminated MCG bearer.

11. The UE according to claim 10, wherein the at least one processor is configured to, in response to satisfaction of the execution condition after transmitting the MN RRC Reconfiguration Complete message, transmit a UL Information Transfer MRDC message containing an SN RRC response message to the serving RAN node and start random access to the candidate PSCell.

12. The UE according to claim 9, wherein the MN RRC Reconfiguration message indicates that the SN terminated MCG bearer is to be changed to an SN terminated split bearer or an SN terminated SCG bearer upon execution of the conditional PSCell addition.

13. The UE according to claim 12, wherein the at least one processor is configured to maintain the SN terminated MCG bearer when a failure of the conditional PSCell addition occurs.

14. The UE according to claim 13, wherein the at least one processor is configured to change the SN terminated split bearer or the SN terminated SCG bearer back to the SN terminated MCG bearer when the failure of the conditional PSCell addition occurs.

15. The UE according to claim 9, wherein the conditional PSCell addition involves a bearer type change of the SN terminated MCG bearer to an SN terminated split bearer or an SN terminated SCG bearer.

16. A method performed by a first Radio Access Network (RAN) node configured to operate as a master node associated with a Master Cell Group (MCG) in dual connectivity for a User Equipment (UE), the method comprising:
   requesting a conditional Primary Secondary Cell (PSCell) addition, via an SN ADDITION REQUEST message, to a candidate secondary node; and
   requesting the candidate secondary node, via the SN ADDITION REQUEST message, to configure an SN terminated MCG bearer, the SN terminated MCG bearer being a radio bearer terminated at the candidate secondary node and using radio resources of the MCG but not using radio resources of a Secondary Cell Group (SCG) associated with the candidate secondary node,
   wherein the conditional PSCell addition requested by the SN ADDITION REQUEST message involves a bearer type change of the SN terminated MCG bearer to an SN terminated split bearer or an SN terminated SCG bearer.

17. The method according to claim 16, wherein the SN ADDITION REQUEST message indicates that the SN terminated MCG bearer is to be changed to the SN terminated split bearer or the SN terminated SCG bearer upon execution of the conditional PSCell addition.

* * * * *